(12) United States Patent
Kim et al.

(10) Patent No.: US 12,063,136 B2
(45) Date of Patent: Aug. 13, 2024

(54) METHOD FOR TRANSMITTING/RECEIVING DATA IN WIRELESS COMMUNICATION SYSTEM, AND DEVICE THEREFOR

(71) Applicant: LG ELECTRONICS INC., Seoul (KR)

(72) Inventors: Hyungtae Kim, Seoul (KR); Duckhyun Bae, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 380 days.

(21) Appl. No.: 17/593,832

(22) PCT Filed: Mar. 26, 2020

(86) PCT No.: PCT/KR2020/004129
§ 371 (c)(1),
(2) Date: Sep. 24, 2021

(87) PCT Pub. No.: WO2020/197286
PCT Pub. Date: Oct. 1, 2020

(65) Prior Publication Data
US 2022/0191081 A1    Jun. 16, 2022

Related U.S. Application Data

(60) Provisional application No. 62/826,065, filed on Mar. 29, 2019, provisional application No. 62/824,260, filed on Mar. 26, 2019.

(30) Foreign Application Priority Data

Aug. 15, 2019 (KR) .................. 10-2019-0099989
Feb. 12, 2020 (KR) .................. 10-2020-0017259

(51) Int. Cl.
*H04W 4/00* (2018.01)
*H04B 1/7156* (2011.01)
(Continued)

(52) U.S. Cl.
CPC ....... *H04L 27/2675* (2013.01); *H04B 1/7156* (2013.01); *H04W 72/23* (2023.01)

(58) Field of Classification Search
CPC . H04L 27/2675; H04L 5/0012; H04L 5/0094; H04L 5/0051; H04L 5/00;
(Continued)

(56) References Cited

U.S. PATENT DOCUMENTS 10,397,909 B2 *  8/2019  Seo .................. H04W 72/23
11,637,672 B2 *  4/2023  Saito ................ H04W 72/0453
                                                              370/329
(Continued)

OTHER PUBLICATIONS

PCT International Application No. PCT/KR2020/004129 International Search Report (Written Opinion) dated Jul. 23, 2020, 4 pages (Translated from Korean to English using Google Translate).*
(Continued)

*Primary Examiner* — Stephen M D Agosta
(74) *Attorney, Agent, or Firm* — LEE, HONG, DEGERMAN, KANG & WAIMEY

(57) ABSTRACT

A method for transmitting/receiving data in a wireless communication system, and a device therefor are disclosed. Particularly, a method by which user equipment (UE) receives data in a wireless communication system comprises the steps of: receiving configuration information including resource allocation information related to a plurality of resource set groups; receiving a first demodulation reference signal (DMRS) and first data from a first resource set; and receiving a second DMRS and second data from a second resource set, wherein the first resource set and the second resource set are included in the same resource set group, (Continued)

pieces of quasi-co-location-related information related with the respective resource sets included in the same resource set group are the same, and the position of a frequency resource of the second DMRS can be shifted from the position of a frequency resource of the first DMRS so as not to be overlapped.

14 Claims, 13 Drawing Sheets

(51) Int. Cl.
*H04L 27/26* (2006.01)
*H04W 72/23* (2023.01)

(58) Field of Classification Search
CPC ...... H04B 1/7156; H04B 1/713; H04B 7/024; H04B 7/06; H04W 72/23; H04W 72/0446
See application file for complete search history.

(56) References Cited

U.S. PATENT DOCUMENTS

| | | | |
|---|---|---|---|
| 2015/0215908 A1* | 7/2015 | Seo | H04L 5/0048 370/329 |
| 2017/0332377 A1* | 11/2017 | Tseng | H04L 5/0053 |
| 2017/0332386 A1* | 11/2017 | Li | H04W 72/0446 |
| 2018/0006863 A1* | 1/2018 | Li | H04W 72/23 |
| 2018/0042028 A1* | 2/2018 | Nam | H04L 5/0035 |
| 2018/0048372 A1 | 2/2018 | Sun et al. | |
| 2018/0132227 A1 | 5/2018 | Ghosh et al. | |
| 2018/0219606 A1* | 8/2018 | Ng | H04L 25/0204 |
| 2019/0149365 A1* | 5/2019 | Chatterjee | H04L 25/0226 370/329 |
| 2019/0159209 A1* | 5/2019 | Xiao | H04W 28/06 |
| 2019/0165880 A1* | 5/2019 | Hakola | H04L 1/1854 |
| 2019/0182006 A1* | 6/2019 | Xiong | H04L 1/1861 |
| 2019/0349904 A1* | 11/2019 | Kwak | H04L 69/324 |
| 2020/0028640 A1* | 1/2020 | Yeo | H04L 5/0007 |
| 2020/0153543 A1* | 5/2020 | Khoshnevisan | H04L 27/261 |
| 2020/0295903 A1* | 9/2020 | Faxér | H04W 24/10 |
| 2021/0084663 A1* | 3/2021 | Takeda | H04W 72/0446 |
| 2021/0099216 A1* | 4/2021 | Takeda | H04B 7/088 |
| 2022/0225138 A1* | 7/2022 | Li | H04W 24/08 |
| 2023/0239106 A1* | 7/2023 | Manolakos | H04L 5/0051 370/329 |

OTHER PUBLICATIONS

PCT International Application No. PCT/KR2020/004129 International Search Report dated Jul. 23, 2020, 5 pages.
Qualcomm Incorporated, "Multi-TRP Enhancements," 3GPP TSG-RAN WG1 Meeting #96, R1-1903043, Feb.-Mar. 2019, 30 pages.
Panasonic, "On multi-TRP enhancements for NR MIMO in Rel. 16," 3GPP TSG RAN WG1 #96, R1-1902522, Feb.-Mar. 2019, 12 pages.
3rd Generation Partnership Project (3GPP), "Technical Specification Group Radio Access Network; NR; Physical layer procedures for data (Release 15)," 3GPP TS 38.214 V15.4.0, Dec. 2018, 102 pages.

* cited by examiner

[Fig. 1]
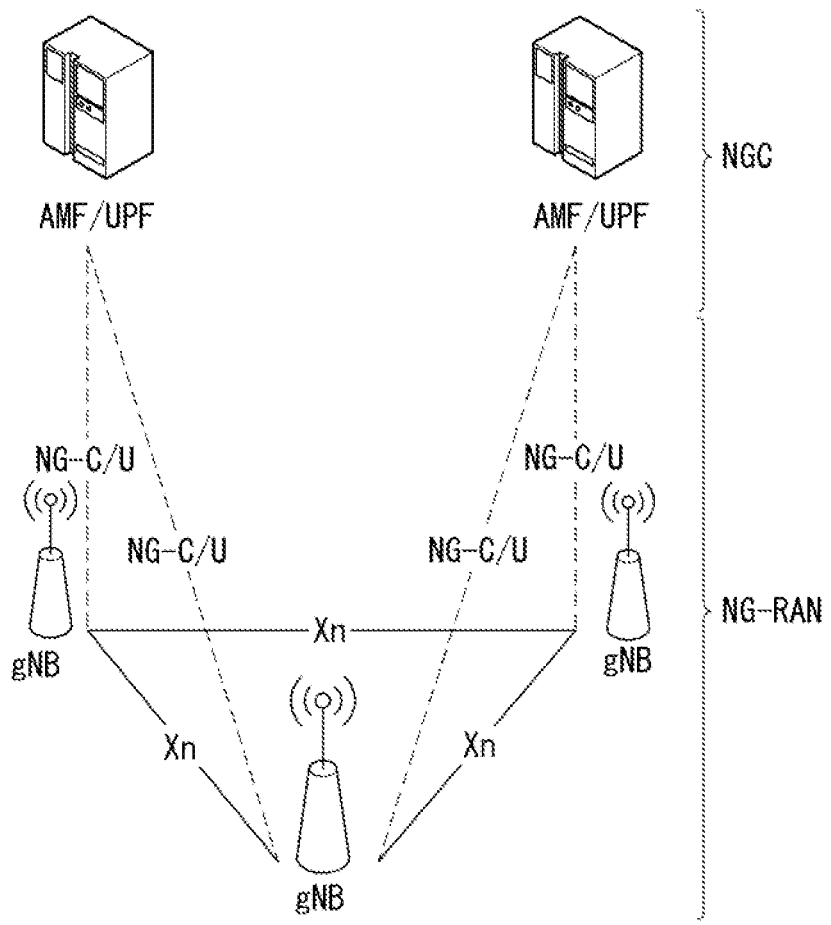
[Fig. 2]
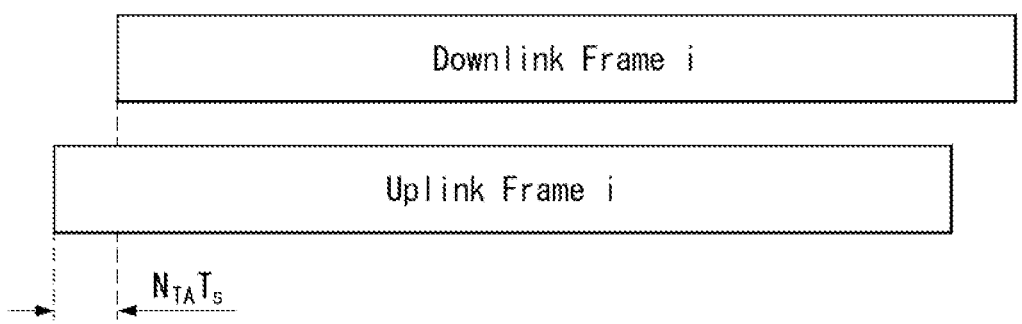

[Fig. 3]
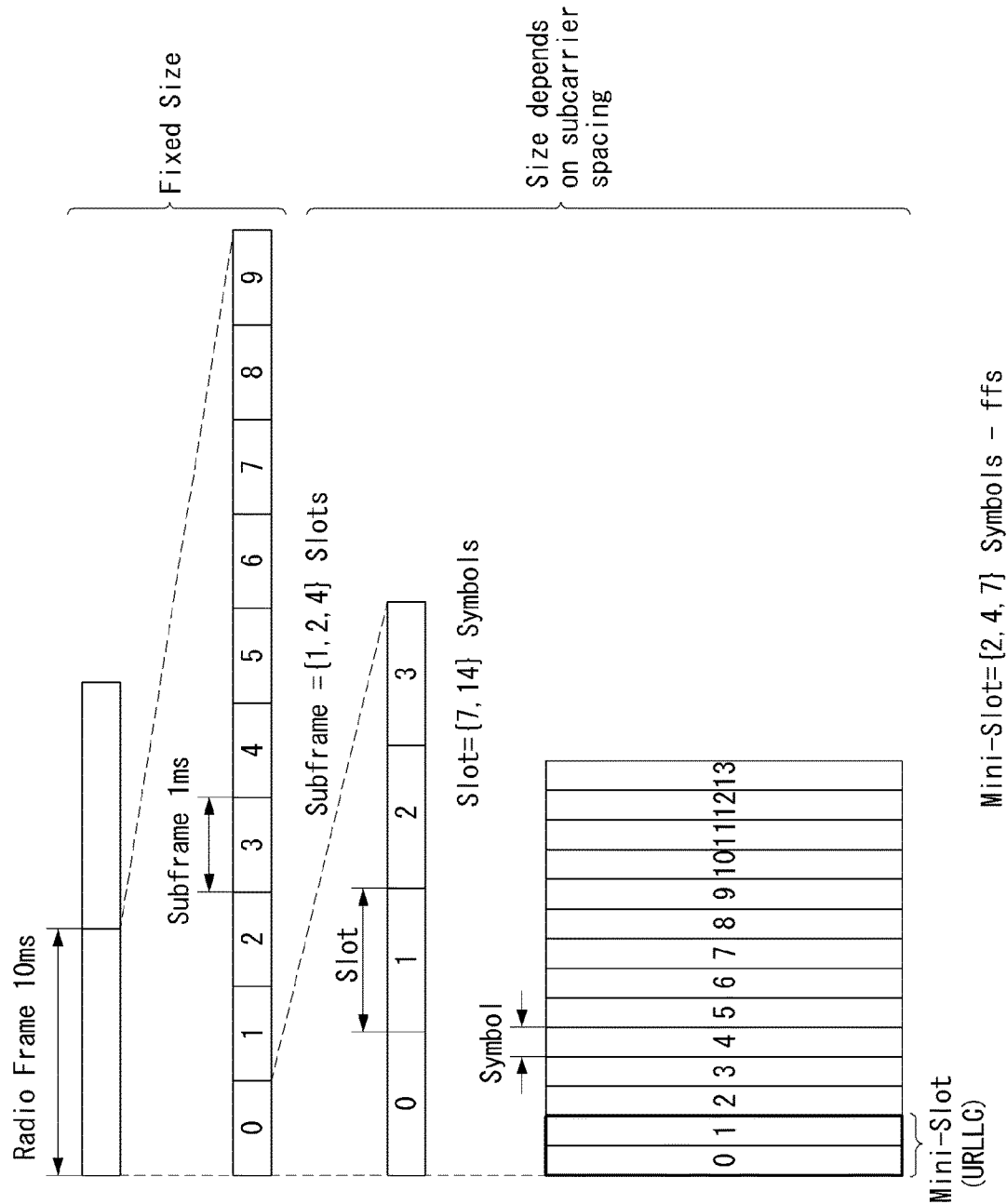

[Fig. 4]
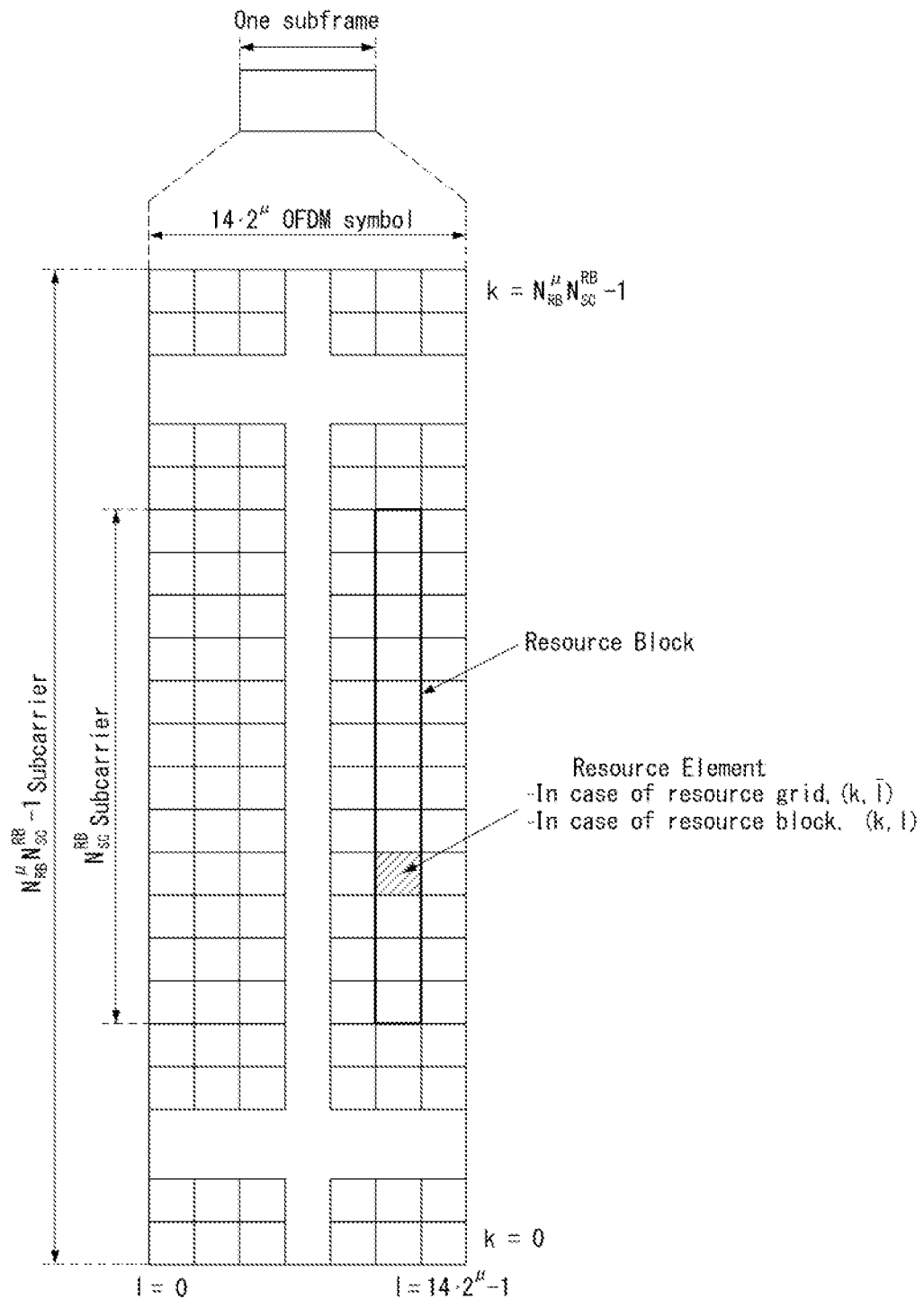

[Fig. 5]
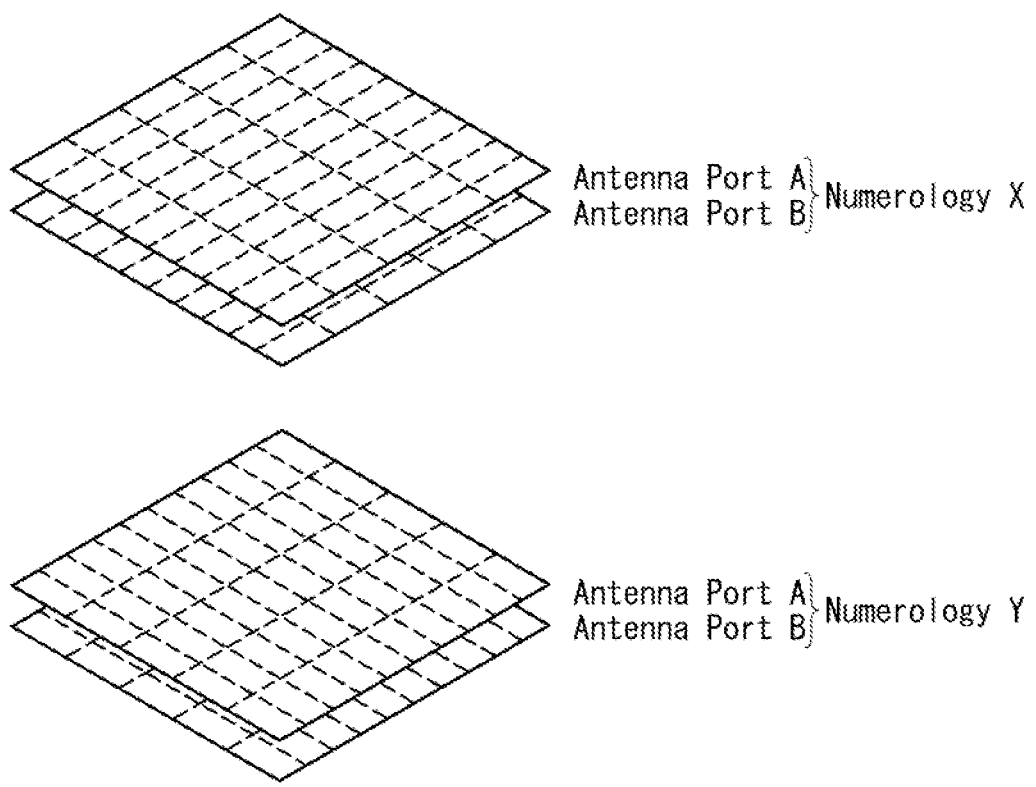

[Fig. 6]
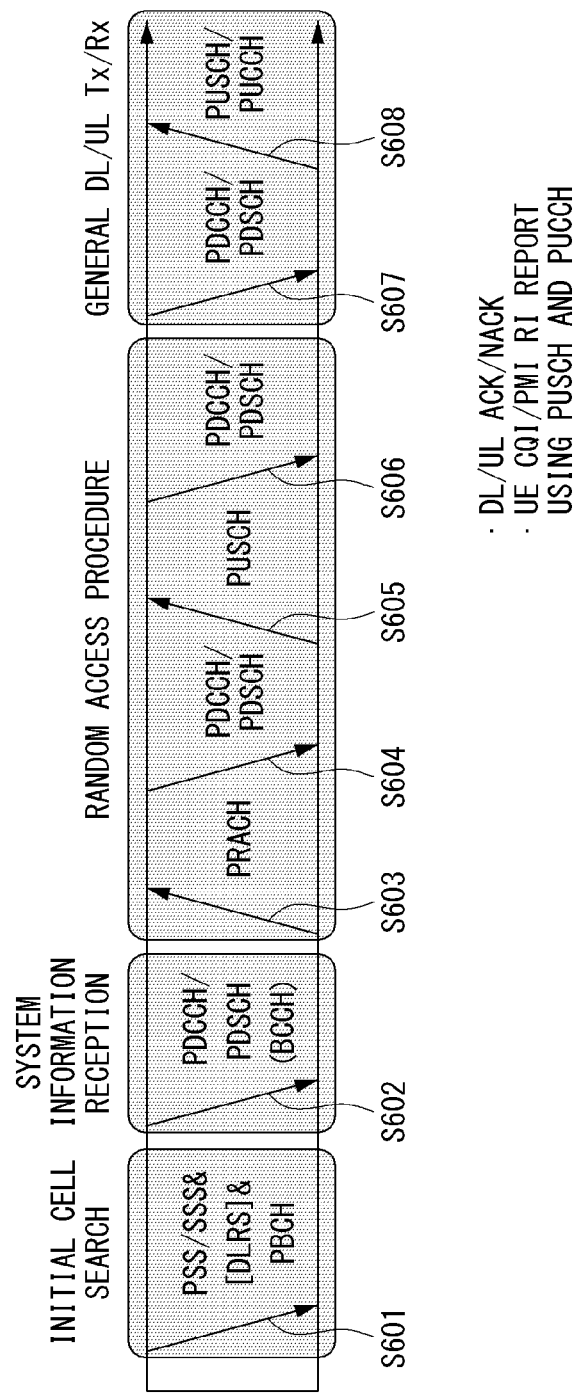

[Fig. 7]
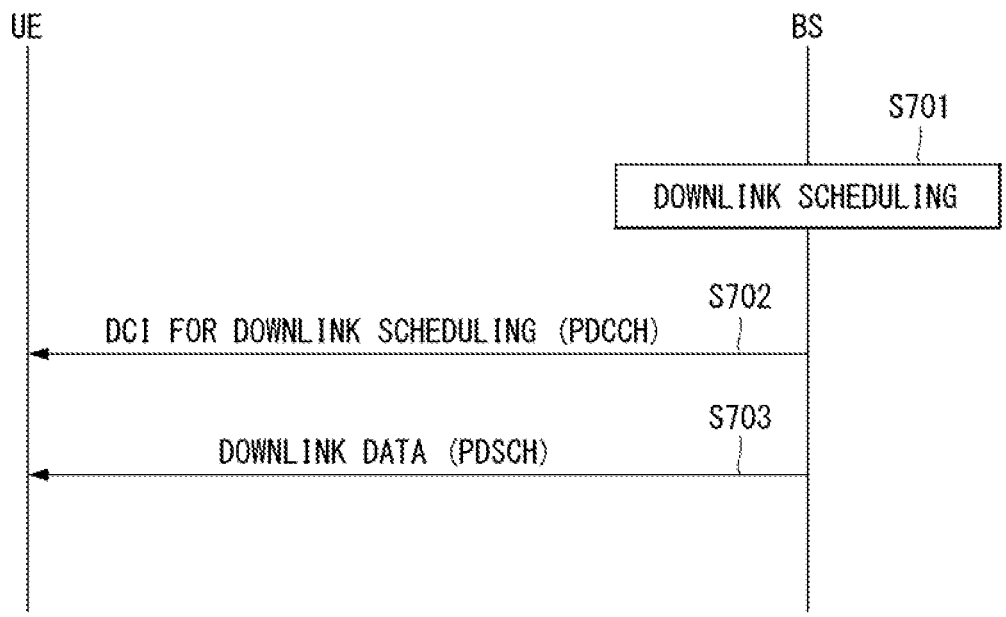
[Fig. 8]
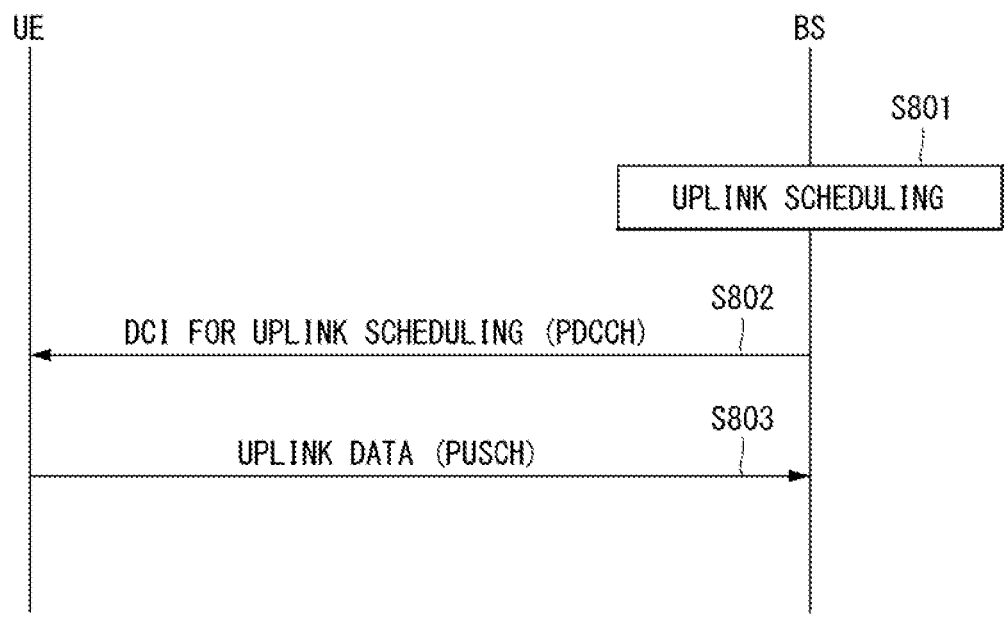

[Fig. 9]
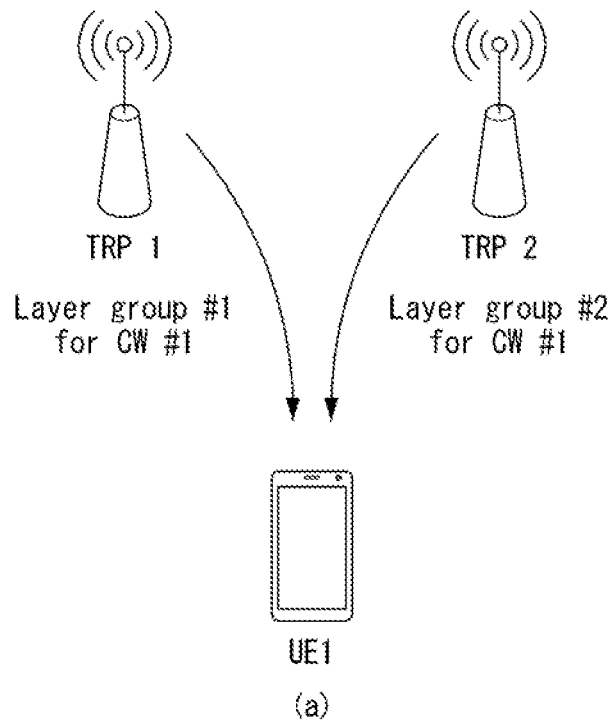
(a)
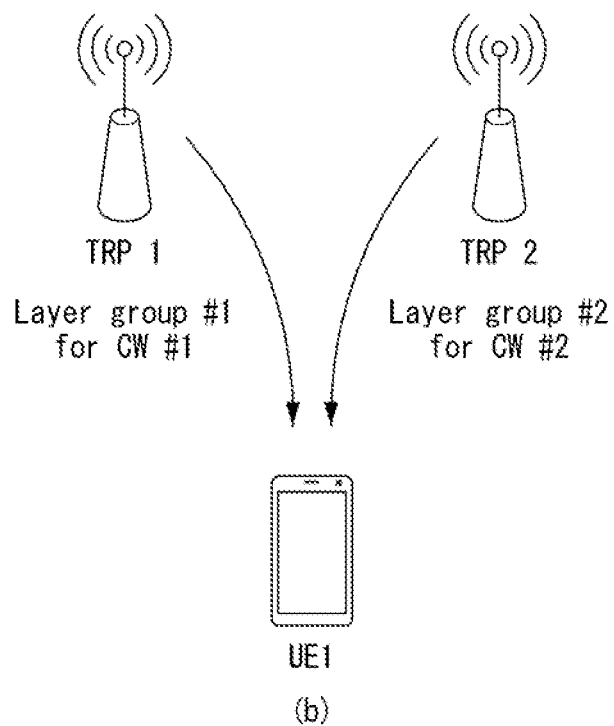
(b)

[Fig. 10]
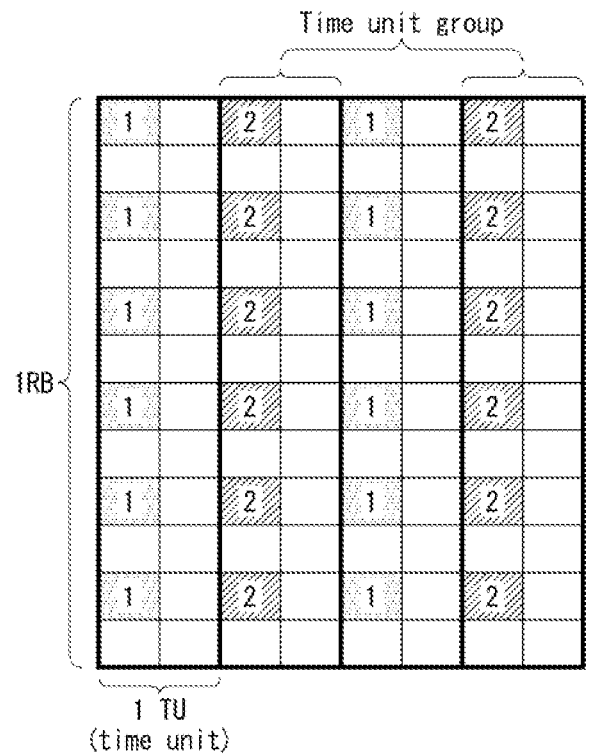
[Fig. 11]
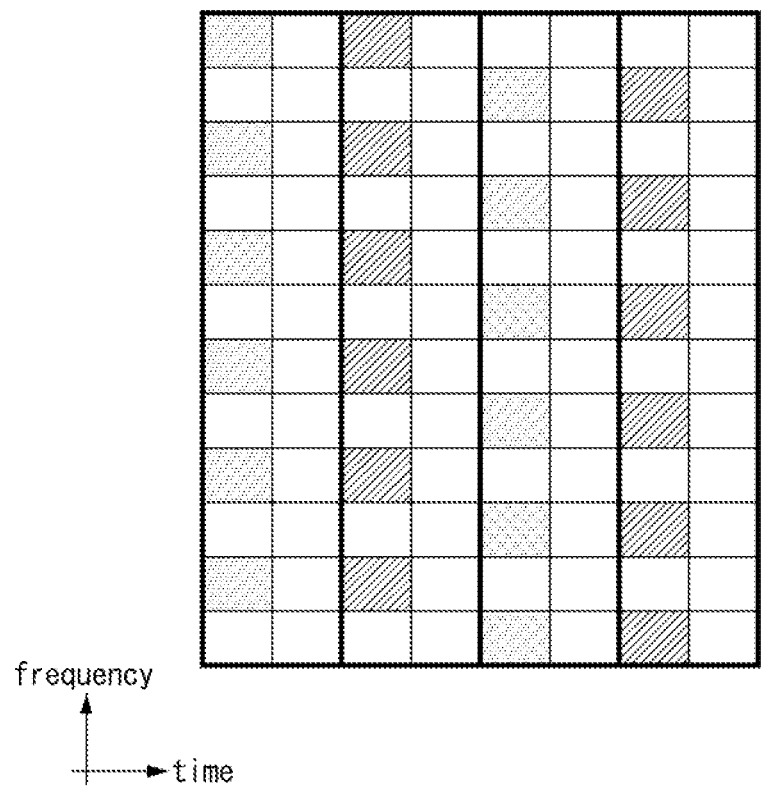

[Fig. 12]
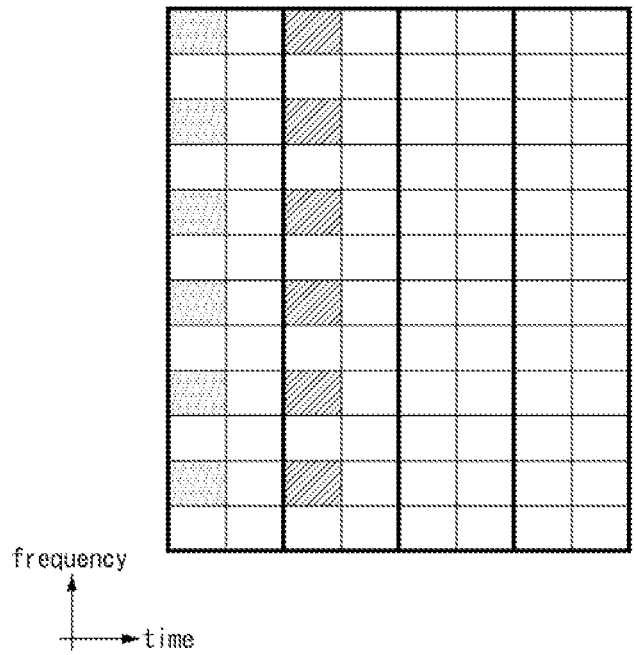
[Fig. 13]
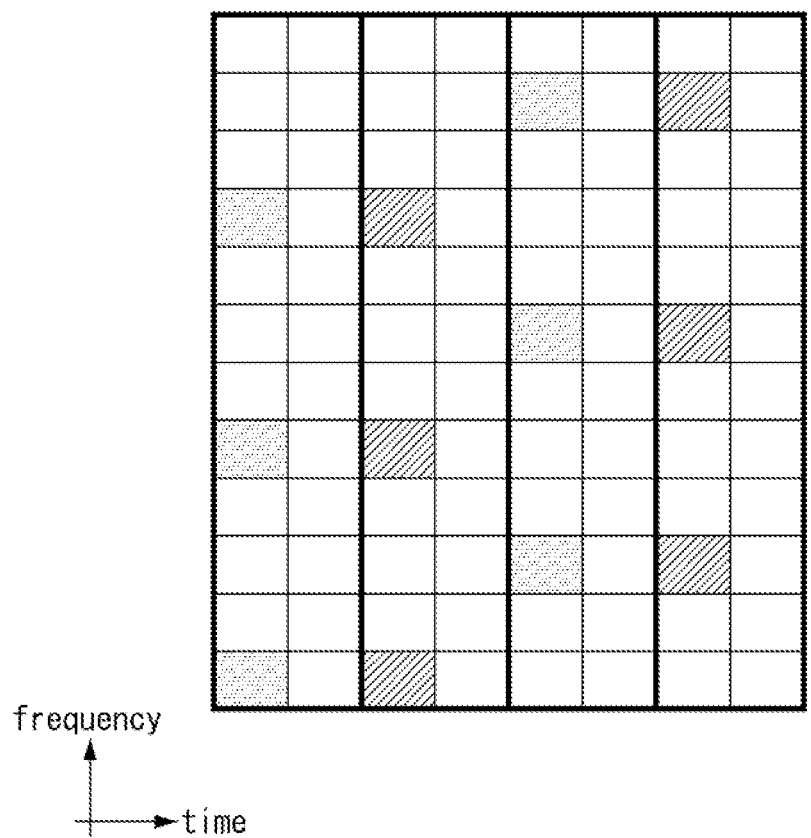

[Fig. 14]
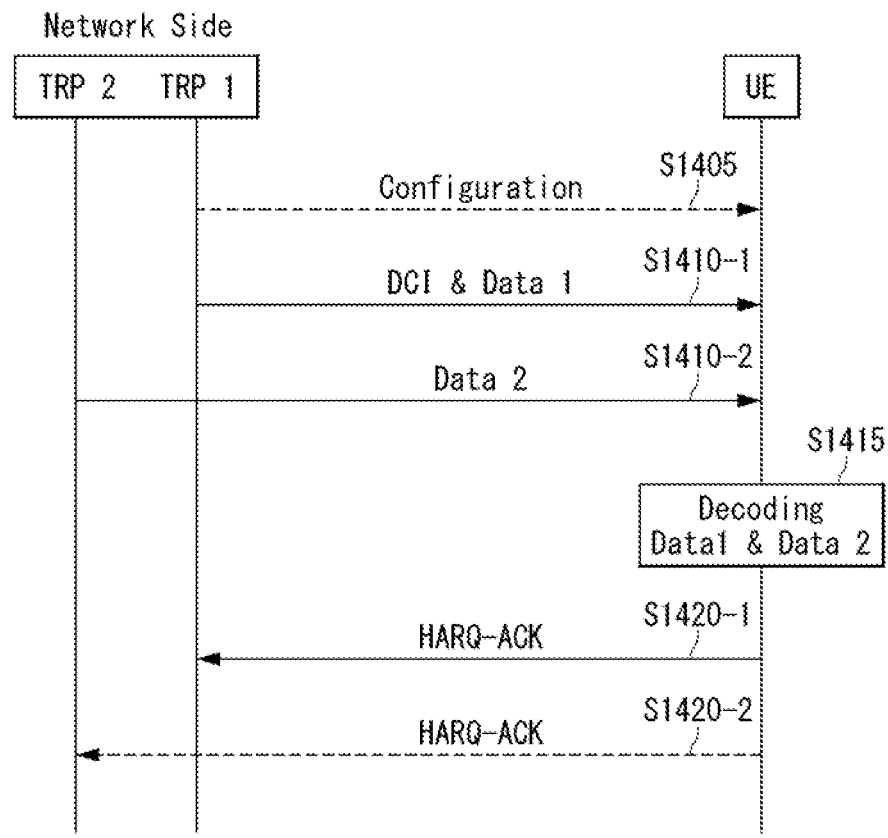
[Fig. 15]
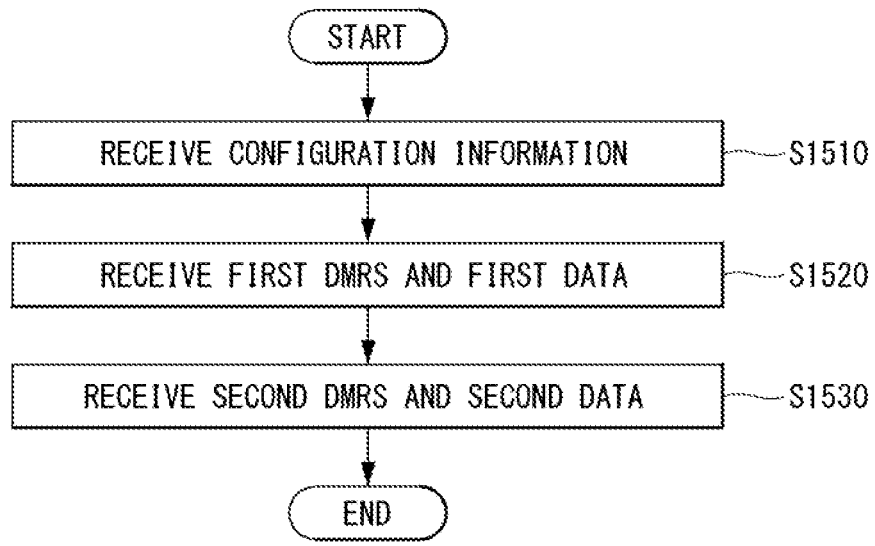

[Fig. 16]
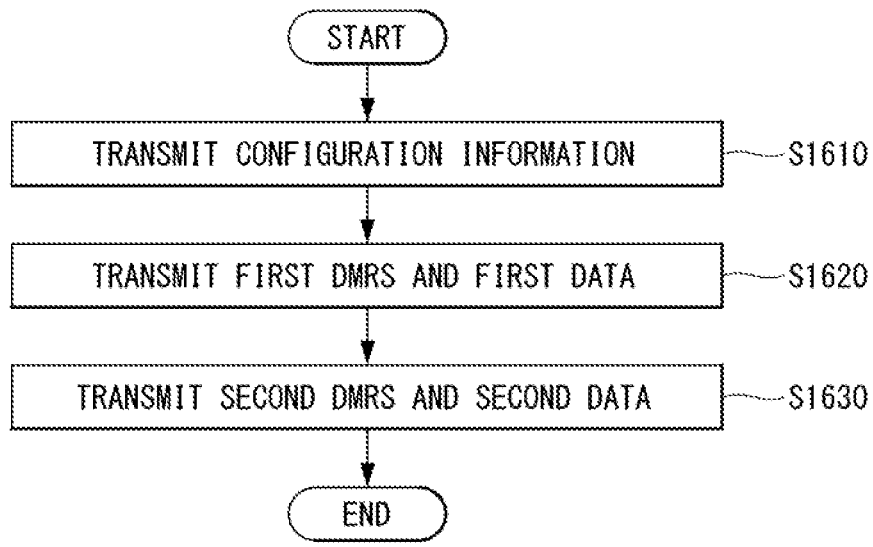
[Fig. 17]
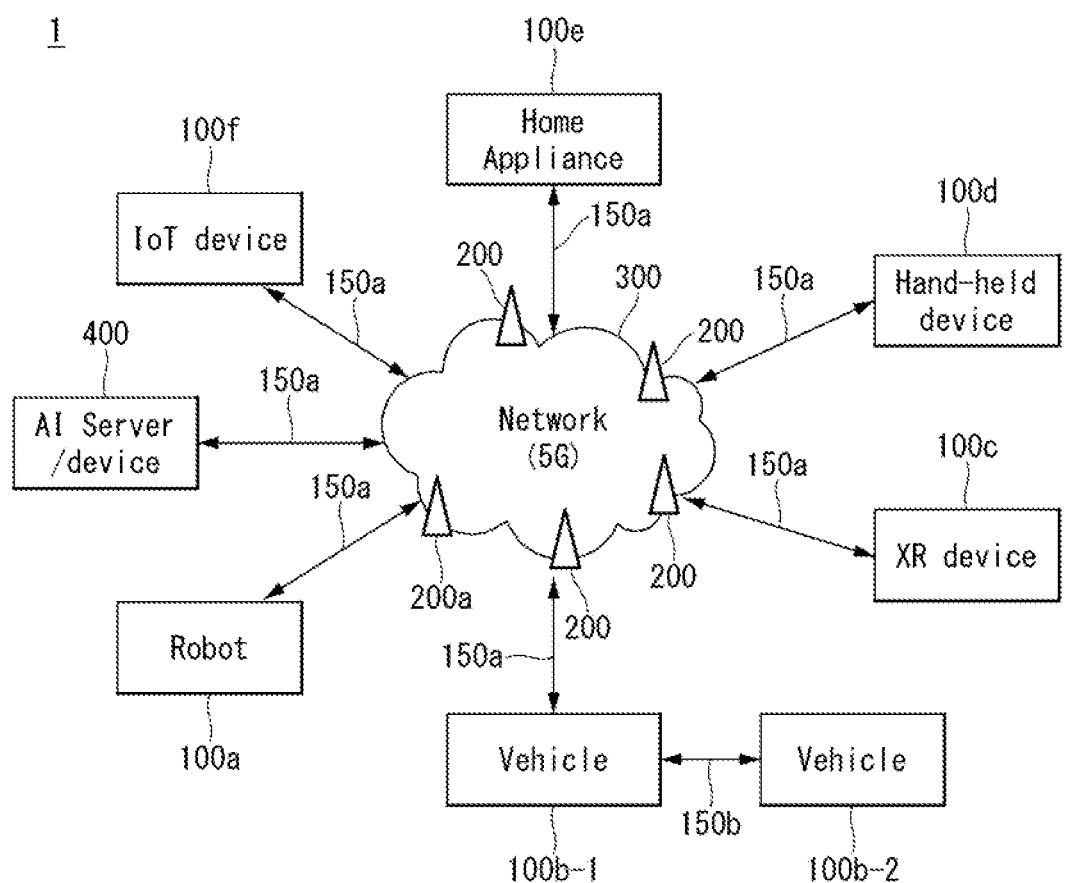

[Fig. 18]
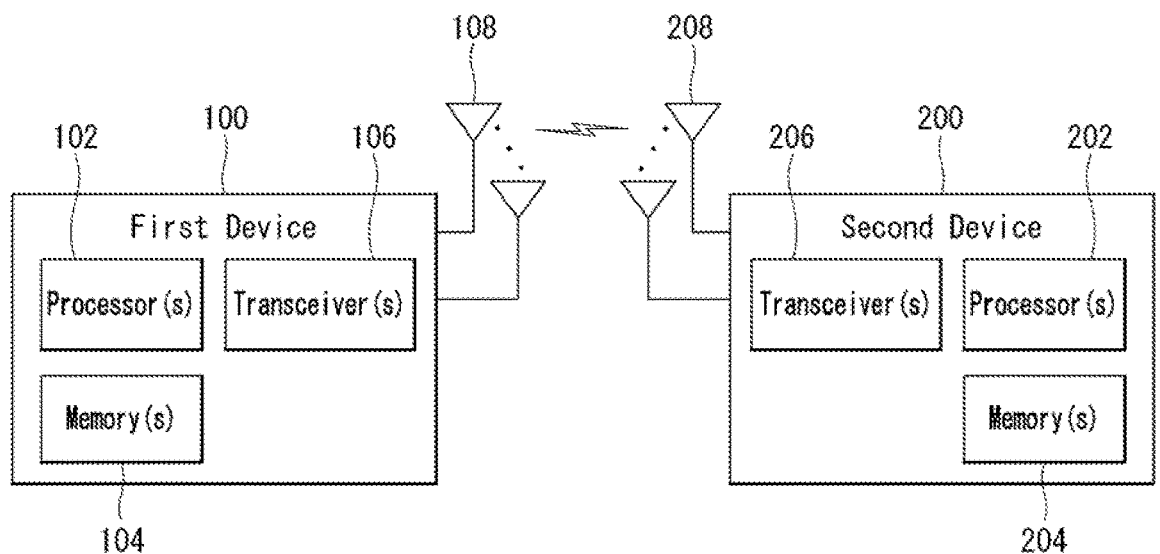
[Fig. 19]
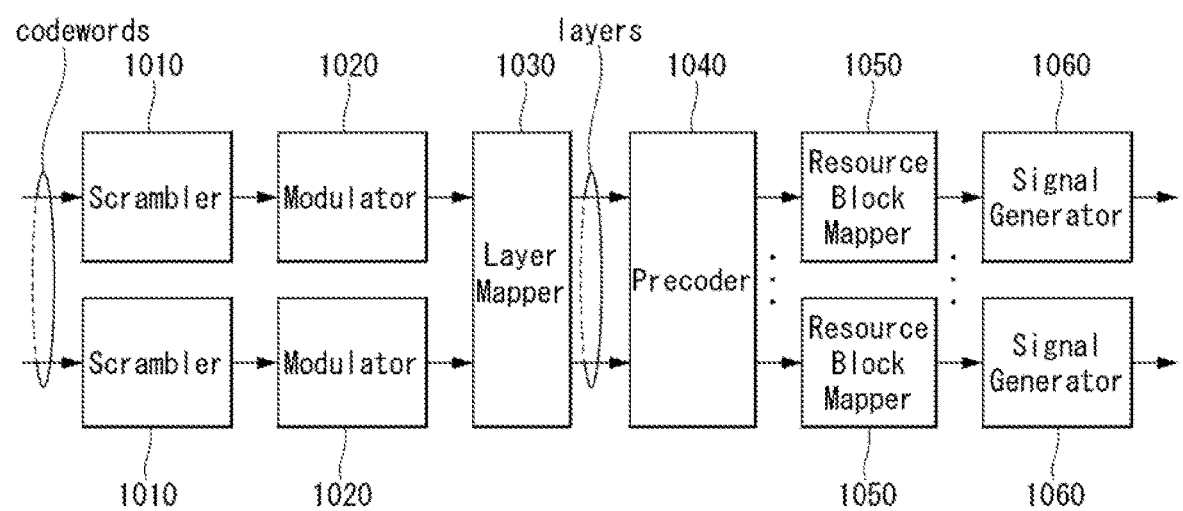

[Fig. 20]
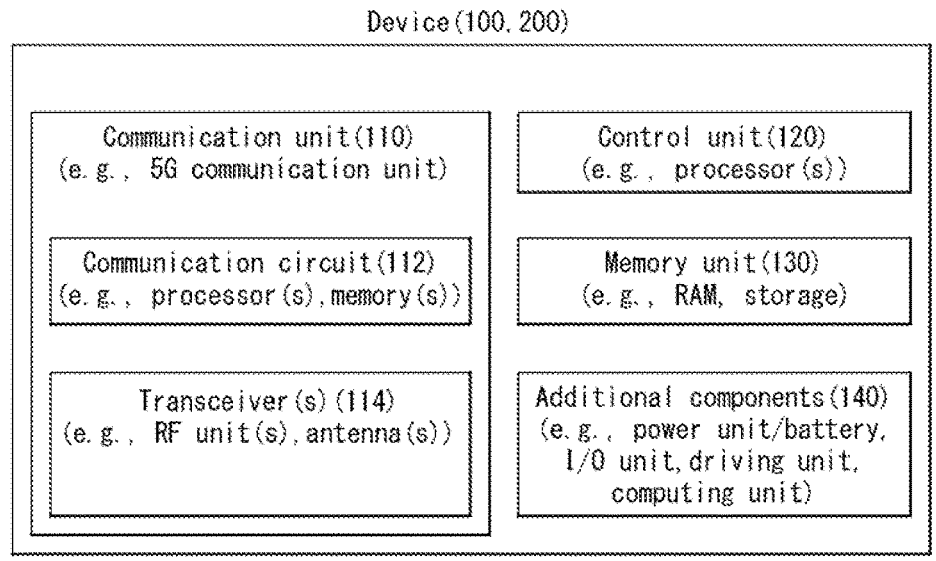
[Fig. 21]
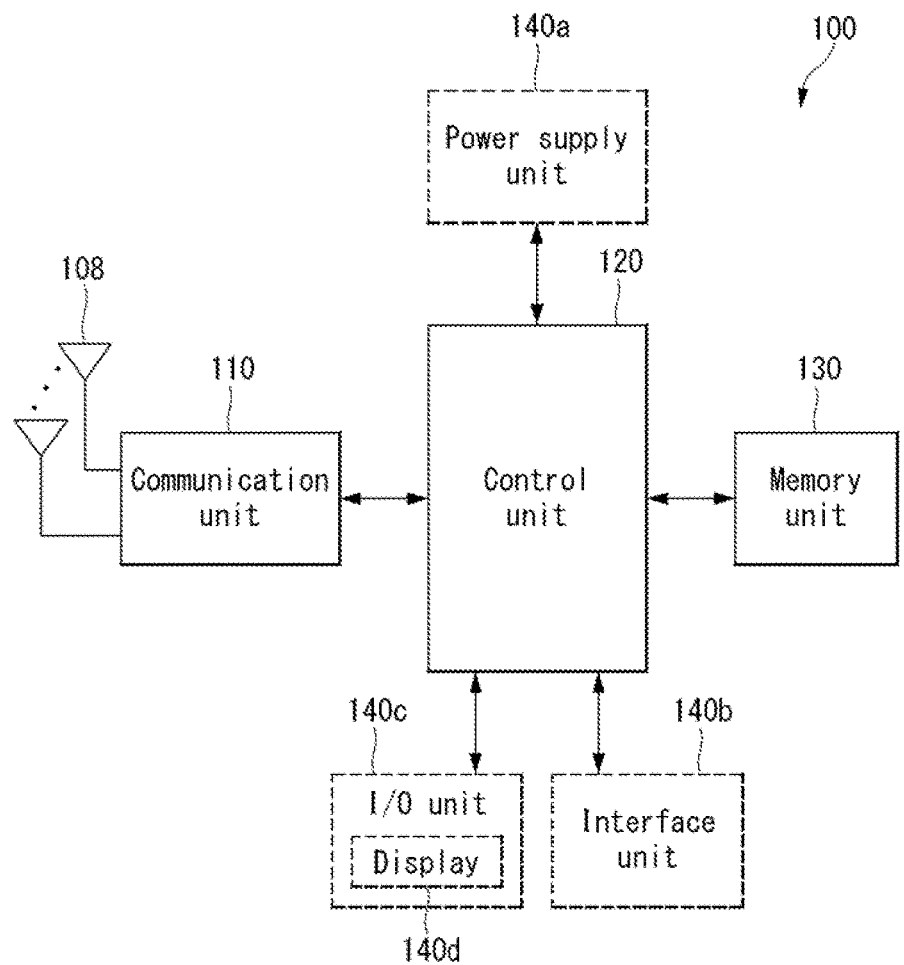

METHOD FOR TRANSMITTING/RECEIVING DATA IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2020/004129, filed on Mar. 26, 2020, which claims the benefit of earlier filing date and right of priority to Korean Patent Application Nos. 10-2019-0099989, filed on Aug. 15, 2019, and 10-2020-0017259, filed on Feb. 12, 2020, and also claims the benefit of U.S. Provisional Application Ser. No. 62/824,260, filed on Mar. 26, 2019, and 62/826,065, filed on Mar. 29, 2019, the contents of which are all incorporated by reference herein in their entirety.

TECHNICAL FIELD

The present disclosure relates to a wireless communication system, and more particularly, to a method for repeatedly transmitting and receiving, by a user equipment (UE) supported by multiple transmission reception points (TRPs), data encoded from the same transport block, and a device supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure proposes a method for transmitting and receiving, by a UE supported by multiple transmission reception points (TRPs), data in a wireless communication system.

Specifically, the present disclosure proposes a method for configuring a transmission type/scheme of multiple TRPs.

Further, the present disclosure proposes a method for transmitting/receiving data encoded from the same transport block for reliability enhancement.

Further, the present disclosure proposes a method for allocating a resource for repeatedly transmitting and receiving the same transport block.

Further, the present disclosure proposes a method for grouping resource sets (time units) associated with the same TCI state in a time domain, and configuring a resource pattern to which a DMRS is mapped in the corresponding group.

Further, the present disclosure proposes a method for determining locations of resource sets associated with the same TCI state included in one resource set group (time unit group) in the time domain based on whether channel interpolation is applied/whether the same precoder is used.

Further, the present disclosure proposes a method for determining locations of resource sets associated with the same TCI state included in one resource set group (time unit group) in the time domain based on frequency hopping.

Technical objects to be achieved in the disclosure are not limited to the aforementioned technical objects, and other technical objects not described above may be evidently understood by a person having ordinary skill in the art to which the disclosure pertains from the following description.

Technical Solution

According to an embodiment of the present disclosure, a method for receiving, by a user equipment (UE), data in a wireless communication system may include: receiving configuration information including resource allocation information related to a plurality of resource set groups, wherein each of the resource set groups includes a plurality of resource sets; receiving a first demodulation reference signal (DMRS) and first data from a first resource set; and receiving a second DMRS and second data from a second resource set, in which the first resource set and the second resource set may be included in the same resource set group, Quasi-co-Location (QCL) related information associated with each resource set included in the same resource set group may be the same, and a location of a frequency resource of the second DMRS may not be overlapped by being shifted from a location of a frequency resource of the first DMRS.

Further, according to an embodiment of the present disclosure, in the method, the second DMRS may be omitted in the second resource set, and the second data may be received in a resource location of the second DMRS.

Further, according to an embodiment of the present disclosure, in the method, the first DMRS may be omitted and the first data may be received in some of frequency resources of the first DMRS, and the second DMRS may be omitted and the first data may be received in some of frequency resources of the second DMRS.

Further, according to an embodiment of the present disclosure, in the method, the DMRS may not be omitted in a first resource set and a last resource set among the plurality of resource sets.

Further, according to an embodiment of the present disclosure, the method may further include receiving information related to omission of the DMRS which is in form of a bitmap, in which whether the DMRS is omitted in the plurality of resource sets is configured based on the information in form of the bitmap.

Further, according to an embodiment of the present disclosure, the method may further include receiving information indicating whether a same precoder is applied to the plurality of resource sets included in a same resource set group.

Further, according to an embodiment of the present disclosure, in the method, the plurality of resource sets may be consecutively located in a time domain based on that the same precoder is applied to the plurality of resource sets.

Further, according to an embodiment of the present disclosure, in the method, a same precoder may be applied to the plurality of resource sets based on that the plurality of resource sets are consecutively located in the time domain.

Further, according to an embodiment of the present disclosure, the method may further include receiving information related to activation of frequency hopping, in which locations of the plurality of resource sets in the time domain may be determined based on the information related to the activation of the frequency hopping.

Further, according to an embodiment of the present disclosure, in the method, whether the frequency hopping is activated may be determined based on locations of the plurality of resource sets in the time domain.

Further, according to an embodiment of the present disclosure, in the method, the first data and the second data may be included in a same transport block.

Further, according to an embodiment of the present disclosure, in the method, each resource set may be comprised of one of one or more symbols, sub-slots, or slots.

Further, according to an embodiment of the present disclosure, the method may further include receiving information on a number of times at which the transport block is repeatedly transmitted, in which resource units comprising each resource set may be calculated based on the information on the number of times at which the transport block is repeatedly transmitted and the number of plurality of resource set groups.

According to an embodiment of the present disclosure, a user equipment (UE) for transmitting and receiving data in a wireless communication system may include: one or more transceivers; one or more processors; and one or more memories storing instructions for operations executed by the one or more processors and connected to the one or more processors, in which the operations may include: receiving configuration information including resource allocation information related to a plurality of resource set groups, wherein each of the resource set groups includes a plurality of resource sets; receiving a first demodulation reference signal (DMRS) and first data from a first resource set; and receiving a second DMRS and second data from a second resource set, the first resource set and the second resource set may be included in the same resource set group, Quasi-co-Location (QCL) related information associated with each resource set included in the same resource set group may be the same, and a location of a frequency resource of the second DMRS may not be overlapped by being shifted from a location of a frequency resource of the first DMRS.

According to an embodiment of the present disclosure, a method for transmitting, by a base station (BS), data in a wireless communication system may include: transmitting configuration information including resource allocation information related to a plurality of resource set groups, wherein each of the resource set groups includes a plurality of resource sets; transmitting a first demodulation reference signal (DMRS) and first data on a first resource set; and transmitting a second DMRS and second data on a second resource set, in which the first resource set and the second resource set may be included in the same resource set group, Quasi-co-Location (QCL) related information associated with each resource set included in the same resource set group may be the same, and a location of a frequency resource of the second DMRS may not be overlapped by being shifted from a location of a frequency resource of the first DMRS.

According to an embodiment of the present disclosure, a base station (BS) for transmitting and receiving data in a wireless communication system may include: one or more transceivers; one or more processors; and one or more memories storing instructions for operations executed by the one or more processors and connected to the one or more processors, in which the operations may include: transmitting configuration information including resource allocation information related to a plurality of resource set groups, wherein each of the resource set groups includes a plurality of resource sets; transmitting a first demodulation reference signal (DMRS) and first data on a first resource set; and transmitting a second DMRS and second data on a second resource set, the first resource set and the second resource set may be included in the same resource set group, Quasi-co-Location (QCL) related information associated with each resource set included in the same resource set group may be the same, and a location of a frequency resource of the second DMRS may not be overlapped by being shifted from a location of a frequency resource of the first DMRS.

According to an embodiment of the present disclosure, a device may include: one or more memories and one or more processors functionally connected to the one or more memories in which the one or more processors may control the device to: receive configuration information including resource allocation information related to a plurality of resource set groups, wherein each of the resource set groups includes a plurality of resource sets; receive a first demodulation reference signal (DMRS) and first data from a first resource set; and receive a second DMRS and second data from a second resource set, the first resource set and the second resource set may be included in the same resource set group, Quasi-co-Location (QCL) related information associated with each resource set included in the same resource set group may be the same, and a location of a frequency resource of the second DMRS may not be overlapped by being shifted from a location of a frequency resource of the first DMRS.

According to an embodiment of the present disclosure, in one or more non-transitory computer-readable media storing one or more instructions, the one or more instructions executable by one or more processors may include instructions for instructing a user equipment (UE) to: receive configuration information including resource allocation information related to a plurality of resource set groups, wherein each of the resource set groups includes a plurality of resource sets; receive a first demodulation reference signal (DMRS) and first data from a first resource set; and receive a second DMRS and second data from a second resource set, the first resource set and the second resource set may be included in the same resource set group, Quasi-co-Location (QCL) related information associated with each resource set included in the same resource set group may be the same, and a location of a frequency resource of the second DMRS may not be overlapped by being shifted from a location of a frequency resource of the first DMRS.

Advantageous Effects

According to an embodiment of the present disclosure, a transmission type/scheme of multiple TRPs can be configured to a UE supported by multiple transmission reception points (TRPs).

Further, according to an embodiment of the present disclosure, data encoded from the same transport block is repeatedly transmitted and received to enhance reliability for data.

Further, according to an embodiment of the present disclosure, resource allocation for repeatedly transmitting and receiving the same transport block can be efficiently performed.

Further, according to an embodiment of the present disclosure, a resource pattern to which a DMRS is mapped is configured differently for each resource set (e.g., time unit) to increase channel estimation accuracy.

Further, according to an embodiment of the present disclosure, a resource is secured by efficiently designing the resource pattern to which the DMRS is mapped to enhance a data reception probability and reduce DMRS overhead.

Further, according to an embodiment of the present disclosure, a frequency diversity gain/time diversity gain can be acquired.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompany drawings, which are included to provide a further understanding of the disclosure and are incorporated on and constitute a part of this disclosure illustrate embodiments of the disclosure and together with the description serve to explain the principles of the disclosure.

FIG. 1 is a diagram illustrating an example of an overall system structure of NR to which a method proposed in the disclosure may be applied.

FIG. 2 illustrates a relationship between an uplink frame and a downlink frame in a wireless communication system to which a method proposed in the disclosure may be applied.

FIG. 3 illustrates an example of a frame structure in an NR system.

FIG. 4 illustrates an example of a resource grid supported by a wireless communication system to which a method proposed in the disclosure may be applied.

FIG. 5 illustrates examples of a resource grid for each antenna port and numerology to which a method proposed in the disclosure may be applied.

FIG. 6 illustrates physical channels and general signal transmission used in a 3GPP system.

FIG. 7 illustrates an example of a downlink transmission/reception operation.

FIG. 8 illustrates an example of an uplink transmission/reception operation.

FIG. 9 illustrates an example of a transmission/reception method for reliability enhancement using transmission in multiple TRPs.

FIG. 10 illustrates an example of 2-TRP transmission in which the same TB is repeatedly transmitted in units of two symbols.

FIG. 11 illustrates an example of 2-TRP transmission in which the same TB is repeatedly transmitted in units of two symbols based on DMRS CDM group shifting proposed in the present disclosure.

FIG. 12 illustrates an example of 2-TRP transmission in which the same TB is repeatedly transmitted in units of two symbols based on DMRS removing (omission) proposed in the present disclosure.

FIG. 13 illustrates an example of lowering a DMRS RE density in each time unit proposed in the present disclosure, but changing and transmitting a location of a transmitted DMRS RE for each time unit.

FIG. 14 illustrates another example of a signaling procedure of performing data transmission and reception between a network side and a UE in a situation of multiple TPs to which a method and/or embodiments proposed in the present disclosure may be applied.

FIG. 15 illustrates an example of an operation flowchart of a UE performing data transmission/reception to which a method and/or an embodiment proposed in the present disclosure may be applied.

FIG. 16 illustrates an example of an operation flowchart of a base station performing data transmission and reception to which a method and/or an embodiment proposed in the present disclosure may be applied.

FIG. 17 illustrates a communication system (1) applied to the disclosure.

FIG. 18 illustrates a wireless device which may be applied to the disclosure.

FIG. 19 illustrates a signal processing circuit for a transmit signal.

FIG. 20 illustrates another example of a wireless device applied to the disclosure.

FIG. 21 illustrates a portable device applied to the disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the disclosure may be referred to for a background art, terms, omissions, etc., used for describing the disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR(New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f / 100) \cdot T_s = 10$. The radio frame is composed of ten subframes each having a section of $T_{sf} = (\Delta f_{max} N_f / 1000) \cdot T_s = 1$ ms. In this case, there may be a set of UL frames and a set of DL frames.

FIG. 2 illustrates a relation between an uplink frame and a downlink frame in a wireless communication system to which a method proposed in the disclosure is applicable.

As illustrated in FIG. 2, uplink frame number i for transmission from a user equipment (UE) shall start $T_{TA} = N_{TA} T_s$ before the start of a corresponding downlink frame at the corresponding UE.

Regarding the numerology µ, slots are numbered in increasing order of $n_s^\mu \in \{0, \ldots, N_{subframe}^{slots, \mu} - 1\}$ within a subframe and are numbered in increasing order of $n_s^\mu \in \{0, \ldots, N_{frame}^{slots, \mu} - 1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame, \mu}$ of slots per radio frame, and the number $N_{slot}^{subframe, \mu}$ of slots per subframe in a normal CP. Table 4 represents the number of OFDM symbols per slot, the number of slots per radio frame, and the number of slots per subframe in an extended CP.

TABLE 3

| µ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| µ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the disclosure.

In Table 4, in case of µ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the disclosure is applicable.

Referring to FIG. 4, a resource grid consists of $N_{RB}^{\mu} N_{sc}^{RB}$ subcarriers on a frequency domain, each subframe consisting of $14 \cdot 2^{\mu}$ OFDM symbols, but the disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max, \mu}$. $N_{RB}^{max, \mu}$ denotes a maximum transmission bandwidth and may change not only between numerologies but also between uplink and downlink.

In this case, as illustrated in FIG. 5, one resource grid may be configured per numerology $\mu$ and antenna port p.

FIG. 5 illustrates examples of a resource grid per antenna port and numerology to which a method proposed in the disclosure is applicable.

Each element of the resource grid for the numerology $\mu$ and the antenna port p is called a resource element and is uniquely identified by an index pair (k, l), where k=0, ..., $N_{RB}^{\mu} N_{sc}^{RB}-1$ is an index on a frequency domain, and l=0, ... $2^{\mu} N_{symb}^{(\mu)}-1$ refers to a location of a symbol in a subframe. The index pair (k, l) is used to refer to a resource element in a slot, where l=0, ..., $N_{symb}^{\mu}-1$.

The resource element (k, l) for the numerology $\mu$ and the antenna port p corresponds to a complex value $\alpha_{k,l}^{(p,\mu)}$. When there is no risk for confusion or when a specific antenna port or numerology is not specified, the indices p and $\mu$ may be dropped, and as a result, the complex value may be $\alpha_{k,l}^{(p)}$ or $\alpha_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration $\mu$.

The center of subcarrier 0 of common resource block 0 for the subcarrier spacing configuration $\mu$ coincides with "point A". A common resource block number $n_{CRB}^{\mu}$ in the frequency domain and resource elements (k, l) for the subcarrier spacing configuration $\mu$ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP.

A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

The slot includes a plurality of symbols in the time domain. For example, in the case of the normal CP, one slot includes 7 symbols, but in the case of the extended CP, one slot includes 6 symbols. A carrier includes a plurality of subcarriers in the frequency domain. The resource block (RB) is defined as a plurality of (e.g., 12) consecutive subcarriers in the frequency domain. A bandwidth part (BWP) may be defined as a plurality of consecutive (P)RBs in the frequency domain and may correspond to one numerology (e.g., SCS, CP length, etc.). The carrier may include a maximum of N (e.g., 5) BWPs. Data communication may be performed through an activated BWP, and only one BWP may be activated in one UE. In a resource grid, each element is referred to as a resource element (RE) and one complex symbol may be mapped.

Bandwidth Part (BWP)

An NR system may be supported up to a maximum of 400 MHz per one component carrier (CC). In a UE operating in such a wideband CC, if the RF for all CCs is always turned on, UE battery consumption may increase. Alternatively, when several use cases (e.g., eMBB, URLLC, Mmtc, and V2X) operating within one wideband CC are taken into consideration, a different numerology (e.g., sub-carrier spacing) may be supported for each frequency band within a corresponding CC. Alternatively, a capability for a maximum of bandwidth may be different for each UE. By taking this into consideration, a base station may instruct a UE to operate only in some bandwidths not a full bandwidth of a wideband CC. Corresponding some bandwidths are defined as a bandwidth part (BWP) for convenience sake. The BWP may be configured with resource blocks (RB) contiguous in a frequency axis, and may correspond to one numerology (e.g., sub-carrier spacing, CP length, slot or mini-slot duration).

Meanwhile, a base station may configure multiple BWPs even within one CC configured in a UE. For example, in a PDCCH monitoring slot, a BWP occupying a relatively small frequency domain may be configured. A PDSCH indicated in a PDCCH may be scheduled on a BWP greater than the BWP. Alternatively, if UEs gather in a specific BWP, for load balancing, some UEs may be configured with other BWP. Alternatively, some spectra of a full bandwidth may be excluded and BWPs on both sides may be configured within the same slot by taking into consideration frequency domain inter-cell interference cancellation between neighboring cells. That is, a base station may configure at least one DL/UL BWP in a UE associated with a wideband CC, may activate at least one DL/UL BWP of DL/UL BWP(s) configured at specific timing (by L1 signaling or MAC CE or RRC signaling). Switching may be indicated (by L1 signaling or MAC CE or RRC signaling) by another configured DL/UL BWP. Alternatively, if a timer value expires based on a timer, switching may be performed on a predetermined DL/UL BWP. In this case, an activated DL/UL BWP is defined as an active DL/UL BWP. However, if a UE is in an initial access process or in a situation, such as before an RRC connection is set up, the UE may not receive a configuration for a DL/UL BWP. In such a situation, a DL/UL BWP assumed by the UE is defined as an initial active DL/UL BWP.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

For example, in the NR system, the DCI format 0_0, the DCI format 0_1 is used for the scheduling of a PUSCH in one cell, and the DCI format 1_0, the DCI format 1_1 is used for the scheduling of a PDSCH in one cell. Information included in the DCI format 0_0 is CRC scrambled by a C-RNTI or a CS-RNTI or an MCS-C-RNTI and is transmitted. Furthermore, the DCI format 0_1 is used to schedule a PUSCH in one cell. Information included in the DCI format 0_1 is CRC scrambled by a C-RNTI or a CS-RNTI or an SP-CSI-RNTI or an MCS-C-RNTI and is transmitted. The DCI format 1_0 is used for the scheduling of a PDSCH in one DL cell. Information included in the DCI format 1_0 is CRC scrambled by a C-RNTI or a CS-RNTI or an MCS-C-RNTI and is transmitted. The DCI format 1_1 is used for the scheduling of a PDSCH in one cell. Information included in the DCI format 1_1 is CRC scrambled by a C-RNTI or a CS-RNTI or an MCS-C-RNTI and is transmitted. The DCI format 2_1 is used to notify a PRB(s) and an OFDM symbol(s) which may be assumed that a UE has not intended transmission. Information, such as preemption indication 1, preemption indication 2, . . . , preemption indication N included in the DCI format 2_1 is CRC scrambled by an INT-RNTI and is transmitted.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMFRI, etc., through the PUSCH and/or PUCCH.

Downlink and Uplink Transmission/Reception Operation

Downlink (DL) Transmission and Reception Operation

FIG. 7 illustrates an example of a downlink transmission and reception operation.

Referring to the FIG. 7, The eNB may schedule downlink transmission such as the frequency/time resource, the transport layer, an downlink precoder, the MCS, etc., (S701). Specifically, the eNB may determine a beam for PDSCH transmission to the UE. In addition, the UE may receive Downlink Control Information (DCI) for downlink scheduling (i.e., including scheduling information of the PDSCH) on the PDCCH (S702). DCI format 1_0 or DCI format 1_1 may be used for the downlink scheduling and specifically, DCI format 1_1 may include information such as the following examples: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization In particular, according to each state indicated in an antenna port(s) field, the number of DMRS ports may be scheduled, and single-user (SU)/Multi-user (MU) transmission scheduling is also available. Further, a TCI field is configured with 3 bits, and the QCL for the DMRS may be dynamically indicated by indicating a maximum of 8 TCI states according to a TCI field value. And, the UE may receive downlink data from the eNB on the PDSCH (S703). When the UE detects a PDCCH including the DCI format 1_0 or 1_1, the UE may decode the PDSCH according to the indication by the corresponding DCI.

Here, when the UE receives a PDSCH scheduled by DCI format 1, a DMRS configuration type may be configured by higher layer parameter "dmrs-Type" in the UE and the DMRS type is used for receiving the PDSCH. Further, in the UE, the maximum number of front-loaded DMRS symbols for the PDSCH may be configured by higher layer parameter "maxLength."

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not related to PDSCH transmission to another UE.

When the UE receives the PDSCH, a precoding granularity P' may be assumed as a consecutive resource block in the frequency domain. Here, P' may correspond to one value of {2, 4, and wideband}. When P' is determined as wideband, the UE does not predict that the PDSCH is scheduled to non-contiguous PRBs and the UE may assume that the same precoding is applied to the allocated resource. On the contrary, when P' is determined as any one of {2 and 4}, a Precoding Resource Block (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE may first read a 5-bit MCS field in the DCI and determine the modulation order and the target code rate. In addition, the UE may read a redundancy version field in the DCI and determine a redundancy version. In addition, the UE may determine the transport block size by using the number of layers before rate matching and the total number of allocated PRBs.

The transport block may be constituted by one or more code block groups (CBGs) and one CBG may be constituted by one or more code blocks (CBs). Further, in the NR system, in addition transport block-unit data transmission/reception, CB/CBG-unit data transmission/reception may be possible. Accordingly, CB/CBG-unit ACK/NACK transmission and retransmission may also be possible. The UE may receive, from the BS, information on the CB/CBG through DCI (e.g., DCI format 0_1, DCI format 1_1, etc.). Further, the UE may receive, from the BS, information on a data transmission unit (e.g., TB/CB/CBG).

Uplink Transmission and Reception Operation

FIG. 8 illustrates an example of an uplink transmission and reception operation.

Referring to the FIG. 8, the eNB may schedule uplink transmission such as the frequency/time resource, the transport layer, an uplink precoder, the MCS, etc., (S801). In particular, the eNB may determine a beam for PUSCH transmission of the UE through the beam management operations described above. And, the UE may receive, from the eNB, DCI for downlink scheduling (i.e., including scheduling information of the PUSCH) on the PDCCH (S802). DCI format 0_0 or 0_1 may be used for the uplink scheduling and in particular, DCI format 0_1 may include information such as the following examples: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter "usage" may be indicated by an SRS resource indicator field. Further, "spatialRelationInfo" may be configured for each SRS resource and a value of "spatialRelationInfo" may be one of {CRI, SSB, and SRI}.

In addition, the UE may transmit the uplink data to the eNB on the PUSCH (S803). When the UE detects a PDCCH including DCI format 0_0 or 0_1, the UE may transmit the corresponding PUSCH according to the indication by the corresponding DCI. Codebook based transmission scheme and non-codebook based transmission scheme are supported for PUSCH transmission.

In the case of the codebook based transmission, when higher layer parameter txConfig" is set to "codebook", the UE is configured to the codebook based transmission. On the contrary, when higher layer parameter txConfig" is set to "nonCodebook", the UE is configured to the non-codebook based transmission. When higher layer parameter "txConfig" is not configured, the UE does not predict that the PUSCH is scheduled by DCI format 0_1. When the PUSCH is scheduled by DCI format 0_0, the PUSCH transmission is based on a single antenna port. In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter "nrofSRS-Ports". When the UE is set to higher layer parameter "txConfig" set to "codebook", at least one SRS resource is configured in the UE. An SRI indicated in slot n is associated with most recent transmission of the SRS resource identified by the SRI and here, the SRS resource precedes PDCCH (i.e., slot n) carrying the SRI.

In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter "srs-ResourceIndicator". The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter "usage" set to "non-Codebook". The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

QCL (Quasi-Co Location)

An antenna port is defined so that a channel in which symbols on an antenna port are carried is inferred from a channel in which other symbols on the same antenna port are carried. If the property of a channel in which symbols on one antenna port are carried may be inferred from a channel in which symbols on another antenna port are carried, the two antenna ports may be said to have a quasi co-located or quasi co-location (QC/QCL) relation.

In this case, the channel property includes one or more of delay spread, Doppler spread, a frequency/Doppler shift, average received power, received timing/average delay, and a spatial RX parameter. In this case, the spatial Rx parameter means a spatial (reception) channel property parameter, such as an angle of arrival.

A UE may be configured with a list of up to M TCI-State configurations within a higher layer parameter PDSCH-Config in order to decode a PDSCH based on a detected PDCCH having DCI intended for the corresponding UE and a given serving cell. The M depends on the UE capability.

Each of the TCI-States includes a parameter for setting a quasi co-location relation between one or two DL reference signals and the DM-RS port of a PDSCH.

The quasi co-location relation is configured with a higher layer parameter qcl-Type1 for the first DL RS and qcl-Type2

(if configured) for the second DL RS. In the case of the two DL RSs, QCL types are the same regardless of whether a reference is the same DL RS or different DL RS or not.

A quasi co-location type corresponding to each DL RS is given by the higher layer parameter qcl-Type of QCL-Info, and may adopt one of the following values:
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, if a target antenna port is a specific NZP CSI-RS, it may be indicated/configured that corresponding NZP CSI-RS antenna ports have been QCLed with a specific TRS from a QCL-Type A viewpoint and QCLed with a specific SSB from a QCL-Type D viewpoint. A UE that has received such an indication/configuration may receive a corresponding NZP CSI-RS using a Doppler, delay value measured in a QCL-Type A TRS, and may apply, to corresponding NZP CSI-RS reception, an Rx beam used for QCL-Type D SSB reception.

A UE may receive an activation command based on MAC CE signaling used to map up to 8 TCI states to the code point of a DCI field "Transmission Configuration Indication."

Codeword (CW) to Layer Mapping

A codeword (CW) refers to separate data stream including information to be transmitted through a physical channel. In the current LTE, NR system, 2 CWs (e.g., CW0, CW1) are defined. All channels use CW0, and CW1 may be used in some cases.

For each codeword q, UE assumes that the block of bits $b^{(q)}(0), \ldots, b^{(q)}(M_{bit}^{(q)}-1)$, where $M_{bit}^{(q)}$ is the number of bits in codeword q transmitted on the physical channel, are scrambled prior to modulation, the scrambled bits block is $\tilde{b}^{(q)}(0), \ldots, \tilde{b}^{(q)}(M_{bit}^{(q)}-1)$. The scrambled bits block is modulated, as a result, it may be represented by complex-valued modulation symbols $d^{(q)}(0), \ldots, d^{(q)}(M_{symb}^{(q)}-1)$.

Table 5 shows an example of CW to layer mapping relationship for spatial multiplexing of the NR standard. UE assumes that complex-valued modulation symbols for each of the codewords to be transmitted are mapped onto one or several layers according to table 5.

complex-valued modulation symbols $d^{(q)}(0), \ldots, d^{(q)}(M_{symb}^{(q)}-1)$ for codeword q may be mapped onto the layers $x(i)=[x^{(0)}(i) \ldots x^{(v-1)}(i)]^T$, $i=0, 1, \ldots, M_{symb}^{layer}-1$. Here, $\upsilon$ is the number of layers $M_{symb}^{layer}$ is the number of modulation symbols per layer)

TABLE 5

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ | $M_{symb}^{layer} = M_{symb}^{(0)}/2$ |
|   |   | $x^{(1)}(i) = d^{(0)}(2i + 1)$ | |
| 3 | 1 | $x^{(0)}(i) = d^{(0)}(3i)$ | $M_{symb}^{layer} = M_{symb}^{(0)}/3$ |
|   |   | $x^{(1)}(i) = d^{(0)}(3i + 1)$ | |
|   |   | $x^{(2)}(i) = d^{(0)}(3i + 2)$ | |
| 4 | 1 | $x^{(0)}(i) = d^{(0)}(4i)$ | $M_{symb}^{layer} = M_{symb}^{(0)}/4$ |
|   |   | $x^{(1)}(i) = d^{(0)}(4i + 1)$ | |
|   |   | $x^{(2)}(i) = d^{(0)}(4i + 2)$ | |
|   |   | $x^{(3)}(i) = d^{(0)}(4i + 3)$ | |
| 5 | 2 | $x^{(0)}(i) = d^{(0)}(2i)$ | $M_{symb}^{layer} = M_{symb}^{(0)}/2 = M_{symb}^{(1)}/3$ |
|   |   | $x^{(1)}(i) = d^{(0)}(2i + 1)$ | |
|   |   | $x^{(2)}(i) = d^{(1)}(3i)$ | |
|   |   | $x^{(3)}(i) = d^{(1)}(3i + 1)$ | |
|   |   | $x^{(4)}(i) = d^{(1)}(3i + 2)$ | |
| 6 | 2 | $x^{(0)}(i) = d^{(0)}(3i)$ | $M_{symb}^{layer} = M_{symb}^{(0)}/3 M_{symb}^{(1)}/3$ |
|   |   | $x^{(1)}(i) = d^{(0)}(3i + 1)$ | |

TABLE 5-continued

| Number of layers | Number of codewords | Codeword-to-layer mapping $i = 0, 1, \ldots, M_{symb}^{layer} - 1$ | |
|---|---|---|---|
|   |   | $x^{(2)}(i) = d^{(0)}(3i + 2)$ | |
|   |   | $x^{(3)}(i) = d^{(1)}(3i)$ | |
|   |   | $x^{(4)}(i) = d^{(1)}(3i + 1)$ | |
|   |   | $x^{(5)}(i) = d^{(1)}(3i + 2)$ | |
| 7 | 2 | $x^{(0)}(i) = d^{(0)}(3i)$ | $M_{symb}^{layer} = M_{symb}^{(0)}/3 = M_{symb}^{(1)}/4$ |
|   |   | $x^{(1)}(i) = d^{(0)}(3i + 1)$ | |
|   |   | $x^{(2)}(i) = d^{(0)}(3i + 2)$ | |
|   |   | $x^{(3)}(i) = d^{(1)}(4i)$ | |
|   |   | $x^{(4)}(i) = d^{(1)}(4i + 1)$ | |
|   |   | $x^{(5)}(i) = d^{(1)}(4i + 2)$ | |
|   |   | $x^{(6)}(i) = d^{(1)}(4i + 3)$ | |
| 8 | 2 | $x^{(0)}(i) = d^{(0)}(4i)$ | $M_{symb}^{layer} = M_{symb}^{(0)}/4 = M_{symb}^{(1)}/4$ |
|   |   | $x^{(1)}(i) = d^{(0)}(4i + 1)$ | |
|   |   | $x^{(2)}(i) = d^{(0)}(4i + 2)$ | |
|   |   | $x^{(3)}(i) = d^{(0)}(4i + 3)$ | |
|   |   | $x^{(4)}(i) = d^{(1)}(4i)$ | |
|   |   | $x^{(5)}(i) = d^{(1)}(4i + 1)$ | |
|   |   | $x^{(6)}(i) = d^{(1)}(4i + 2)$ | |
|   |   | $x^{(7)}(i) = d^{(1)}(4i + 3)$ | |

The block of vectors $[x^{(0)}(i) \ldots x^{(v-1)}(i)]^T$, $i=0, 1, \ldots, M_{symb}^{layer}-1$ may be mapped to antenna ports according to equation 3.

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}$$ [Equation 3]

where $i=0, 1, \ldots, M_{symb}^{ap}-1$, $M_{symb}^{sp}=M_{symb}^{layer}$

The set of antenna ports $\{p_0, \ldots, p_{v-1}\}$ may be determined according to the procedure in [4, TS 38.212].

For each antenna port used for transmission of a physical channel, blocks $y^{(p)}(0), \ldots, y^{(p)}(M_{symb}^{sp}-1)$ of complex value symbols are sequentially mapped to resource elements $(k', l)_{p, \mu}$ in a virtual resource block by starting from $y^{(p)}(0)$. Mapping to resource elements $(k', l)_{p, \mu}$ which are not reserved for allocation and another purpose for a PDSCH is performed in ascending order from a first index k' of an allocated VRB. Here, k'=0 means a first subcarrier of a lowest VRB allocated for transmission.

The UE assumes that a virtual resource block (VRB) is mapped to a physical resource block (PRB) according to an indicated mapping scheme, non-interleaved mapping, or interleaved mapping. For example, in non-interleaved VRB to PRB mapping, VRB n may be mapped to PRB n except for PDSCH transmission scheduled by DCI format 1_0. In interleaved VRB to PRB mapping, resource block bundles may be defined (NR standard document TS 38.211 may be referenced for the definition of the resource block bundles). Further, VRBs in an interval $j \in \{0, 1, \ldots, N_{bundle}-1\}$ may be mapped to PRBs as follows. A VRB bundle $N_{bundle}-1$ may be mapped to a PRB bundle $N_{bundle}-1$. A VRB bundle $j \in \{0, 1, \ldots, N_{bundle}-2\}$ may be mapped to a PRB bundle f(j).

Further, NR standard document TS 38.211 may be referenced may be for contents such as the codeword to layer mapping and mapping to the virtual resource block, mapping to the physical resource block, etc., which may be applied.

The description may be applied/used in combination with methods and/or embodiments proposed in the present disclosure or may be supplemented to clarify technical features of the methods proposed in the present disclosure. In the present disclosure, '/' may mean that all of the contents distinguished by/are included (and) or only some of the distinguished contents are included (or).

Multi-Transmission/Reception Point (TRP) Related Operation

A technique of Coordinated Multi Point (CoMP) refers to a scheme in which a plurality of base stations exchange (e.g., use the X2 interface) or utilize channel information (e.g., RI/CQI/PMI/LI, etc.) fed back from the UE, coordinated transmission to the UE, to effectively control interference. According to a scheme using the channel information fed back from the UE, types of CoMP may be classified into Joint transmission (JT), Coordinated scheduling (CS), Coordinated beamforming (CB), dynamic point selection (DPS), dynamic point blanking (DPB), etc.

NCJT (Non-coherent joint transmission) may mean cooperative transmission that does not consider interference (i.e., no coherence). As an example, the NCJT may be a method in which base station(s) transmit data to one UE using same time resource and frequency resource through multiple TRPs. In this case, multiple TRPs of base station(s) may be configured to transmit data to the UE through different layers using different demodulation reference signal (DMRS) ports. In other words, the NCJT may correspond to a transmission scheme in which transmission of the MIMO layers is performed from two or more TRPs without adaptive precoding between the TRPS.

The NCJT is divided into fully overlapped NCJT in which time frequency resources transmitted by respective TRPs are fully overlapped and partially overlapped NCJT in which only some time frequency resources are overlapped. That is, in the case of the partially overlapped NCJT, both transmission data of TRP1 and TRP2 are transmitted in some time frequency resources, and only one TRP of TRP1 or TRP2 transmits data in the remaining time frequency resources.

TRP transmits data scheduling information to a UE receiving the NCJT as Downlink Control Information (DCI). From the DCI transmission point of view, M-TRP (multiple TRP) transmission schemes are divided into i) multiple DCI (M-DCI) based M-TRP transmission scheme in which each TRP transmits a different DCI and ii) single DCI (S-DCI) based M-TRP transmission sheme in which one TRP transmits DCI.

First, a single DCI based MTRP scheme is described. In the single DCI based M-TRP scheme in which one representative TRP delivers scheduling information for data transmitted by itself and data transmitted by another TRP via single DCI, MTRP cooperatively transmit a common one PDSCH and each TRP participating in cooperative transmission transmits the corresponding PDSCH by spatially dividing into different layers (i.e., different DMRS ports). In other words, MTRP tranmit one PDSCH, but each TRP transmits only some layers of multiple layers comprising the one PDSCH. For example, when 4 layer data is transmitted, TRP 1 transmits 2 layers and TRP2 transmits remaining 2 layers to the UE.

In this case, scheduling information for the PDSCH is indicated to the UE through one DCI, and the corresponding DCI indicates which DMRS port uses which QCL RS and QCL type of information (this is different from indicating QCL and TYPE to be commonly applied to all DMRS ports indicated by the DCI in the related art). That is, M TCI states are indicated through a TCI field in the DCI (in the case of 2 TRP coordinated transmission, M=2), and the QCL RS and type are determined by using M different TCI states for each of M DMRS port groups. Further, DMRS port information may be indicated by using a new DMRS table.

As an example, in the case of the S-DCI, since all scheduling information for data transmitted by M TRPs should be delivered through one DCI, the S-DCI may be used in an ideal backhaul (BH) environment in which two TRPs may be dynamically coordinated with each other.

Second, a multiple DCI based MTRP scheme is described. MTRPs transmit different DCIs and PDSCHs (UE receives N DCIs and N PDSCHs from N TRPs), and (some or all of) the corresponding PDSCHs are overlapped and transmitted on different frequency time resources. The corresponding PDSCHs may be scrambled through different scrambling IDs and the corresponding DCIs may be transmitted through Coresets which belong to different Coreset groups (Coreset group may be determined as an index defined a Coreset configuration of each Coreset, and for example, if index=0 is configured in Coresets 1 and 2 and index=1 is configured in Coresets 3 and 4, Coresets 1 and 2 belongs to Coreset group 0 and Coresets 3 and 4 belong to Coreset group 1. Further, in a case where the index in the Coreset is not defined, the case may be construed as index=0. When a plurality of scrambling IDs is configured or two or more Coreset groups are configured in one serving cell, it can be seen that the UE receives data by a multiple DCI based MTRP operation.

As an example, whether the used scheme is the single DCI based MTRP scheme or the multiple DCI based MTRP scheme may be indicated to the UE through separate signaling. As an example, when multiple CRS patterns are indicated to the UE for the MTRP operation with respect to one serving cell, PDSCH rate matching for the CRS may vary depending on whether the used scheme is the single DCI based MTRP scheme or the multiple DCI based MTRP scheme.

A base station (BS) described in the present disclosure may be a generic term for an object that transmits/receives data to and from a terminal (or a user equipment (UE)). For example, the BS described herein may be a concept including one or more transmission points (TP), one or more transmission and reception points (TRP), and the like. For example, multiple TPs and/or multiple TRPs described herein may be included in one BS or included in multiple BSs. In addition, the TP and/or TRP may include a panel of a BS, a transmission and reception unit, and the like.

Further, the TRP described in the present disclosure may mean an antenna array having one or more antenna elements available in a network at which a specific geographical location of a specific area is positioned. In the present disclosure, for convenience of description, "TRP" is described as a reference, but the TRP may be replaced with a base station, a transmission point (TP), a cell (e.g., macro cell/small cell/pico cell), an antenna array, or a panel, and appreciated/applied.

Further, CORESET group ID described in the present disclosure may mean index/identification information (e.g., ID)/indicator, etc. for distinguishing CORESET configured for/associated with each TRP/panel (or, for each TRP/panel). In addition, a CORESET group may be a group/union of CORESETS which are distinguished by the index/identification information (e.g., ID)/the CORESET group ID, etc., for distinguishing the CORESET. As an example, the CORESET group ID may specific index information defined within a CORESET configuration. As an example, the CORESET group may be configured/indicated/defined by an index defined in the CORESET configuration for each CORESET. The CORESET group ID may be configured/indicated via higher layer signaling (e.g., RRC signaling)/L2 signaling (e.g., MAC-CE)/L1 signaling (e.g., DCI), etc.

The UE may recognize PUSCH (or PUCCH) scheduled by DCI received by different CORESETs (or CORESETs which belong to different CORESET groups) as PUSCH (or PUCCH) transmitted to different TRPs or PUSCH (or PUCCH) of different TRPs. Further, a scheme for UL transmission (e.g., PUSCH/PUCCH) transmitted to different TRPs may be applied equally even to UL transmission (e.g., PUSCH/PUCCH) transmitted to different panels which belong to the same TRP.

M-TRP (Multiple-TRP) Transmission Schemes

An M-TRP transmission scheme in which multiple (e.g., M) TRPs transmit data to one user equipment (UE) may be divided into two main types, eMBB M-TRP transmission which is a scheme for increasing a transmission rate and URLLC M-TRP transmission which is a scheme for increasing a reception success rate and reducing latency.

URLLC M-TRP may mean that M TRPs transmit the same transport block (TB) by using different layers/times/frequencies. It may be assumed that a UE which is configured with an URLLC M-TRP transmission scheme is indicated with multiple TCI state(s) through the DCI and data received by using a QCL RS of each TCI state are the same TB. On the contrary, eMBB M-TRP may mean that M TRPs transmit different TBs by using different layers/times/frequencies. It may be assumed that a UE which is configured with an eMBB M-TRP transmission scheme is indicated with multiple TCI state(s) through the DCI and the data received by using the QCL RS of each TCI state are different TBs.

Table 6 shows various schemes which may be considered for URLLC M-TRP transmission. Referring to Table 6, various schemes such as SDM/FDM/TDM schemes exist.

TABLE 6

To facilitate further down-selection for one or more schemes in RAN1#96bis, schemes for multi-TRP based URLLC, scheduled by single DCI at least, are clarified as following:
- Scheme 1 (SDM): n (n <= $N_s$) TCI states within the single slot, with overlapped time and frequency resource allocation
- Scheme 1a:
- Each transmission occasion is a layer or a set of layers of the same TB, with each layer or layer set is associated with one TCI and one set of DMRS port(s).
- Single codeword with one RV is used across all spatial layers or layer sets. From the UE perspective, different coded bits are mapped to different layers or layer sets with the same mapping rule as in Rel-15.
- Scheme 1b:
- Each transmission occasion is a layer or a set of layers of the same TB, with each layer or layer set is associated with one TCI and one set of DMRS port(s).
- Single codeword with one RV is used for each spatial layer or layer set. The RVs corresponding to each spatial layer or layer set can be the same or different.
- Scheme 1c:
- One transmission occasion is one layer of the same TB with one DMRS port associated with multiple TCI state indices, or one layer of the same TB with multiple DMRS ports associated with multiple TCI state indices one by one.
- For Scheme 1a and 1c, the same MCS is applied for all layers or layer sets.
- For scheme 1b, same or different MCS/modulation orders for different layers or layer sets can be discussed.
- Scheme 2 (FDM): n (n <= $N_f$) TCI states within the single slot, with non-overlapped frequency resource allocation
- Each non-overlapped frequency resource allocation is associated with one TCI state.
- Same single/multiple DMRS port(s) are associated with all non-overlapped frequency resource allocations.
- Scheme 2a:
- Single codeword with one RV is used across full resource allocation. From UE perspective, the common RB mapping (codeword to layer mapping) is applied across full resource allocation.
- Scheme 2b:
- Single codeword with one RV is used for each non-overlapped frequency resource allocation. The RVs corresponding to each non-overlapped frequency resource allocation can be the same or different.
- For scheme 2a, same MCS is applied for all non-overlapped frequency resource allocations
- For scheme 2b, same or different MCS/modulation orders for different non-overlapped frequency resource allocations can be discussed.
- Details of frequency resource allocation mechanism for FDM 2a/2b with regarding to allocation granularity, time domain allocation can be discussed.
- Scheme 3 (TDM): n (n <= $N_{t1}$) TCI states within the single slot, with non-overlapped time resource allocation
  - Each transmission occasion of the TB has one TCI and one RV with the time granularity of mini-slot.
  - All transmission occasion (s) within the slot use a common MCS with same single or multiple DMRS port(s).
  - RV/TCI state can be same or different among transmission occasions.
  - FFS channel estimation interpolation across mini-slots with the same TCI index
- Scheme 4 (TDM): n (n <= $N_{t2}$) TCI states with K (n <= K) different slots.
  - Each transmission occasion of the TB has one TCI and one RV.
  - All transmission occasion (s) across K slots use a common MCS with same single or multiple DMRS port(s)
  - RV/TCI state can be same or different among transmission occasions.
  - FFS channel estimation interpolation across slots with the same TCI index Note that M-TRP/panel based URLLC schemes shall be compared in terms of improved reliability, efficiency, and specification impact.
Note:
Support of number of layers per TRP may be discussed FIG. 9 is an example of a transmission and reception method for improving reliability supported by multiple TRPs, the following two methods may be considered.

The example of FIG. 9(a) illustrates a case where layer groups transmitting the same codeword (CW)/TB (transport block) correspond to different TRPs. That is, same CW may be transmitted through different layers/layer groups. In this case, the layer group may mean a kind of layer set comprising one layer or one or more layers. As described above, as the number of layers increases, the quantity of transmission resources increases, and thus, there is an advantage in that robust channel coding of a low coding rate may be used for the transport block (TB). Further, since channels from multiple TRPs are different, reliability enhancement of a received signal may be expected based on a diversity gain.

Meanwhile, the example of FIG. 9(b) illustrates an example of transmitting different CWs through layer groups corresponding to different TRPs. That is, different CWs are transmitted through different layers/layer groups. In this case, it may be assumed that TBs corresponding to a first CW (CW #1) and a second CW (CW #2) are the same as each other. Accordingly, the example may be regarded as an example of repeated transmission of the same TB. The case of FIG. 9(b) may have a disadvantage that the coding rate corresponding to the TB is high as compared with the case of FIG. 9(a). However, there is an advantage in that the coding rate may be adjusted by indicating different redundancy version (RV) values for encoding bits generated from the same TB according to a channel environment or a modulation order of each CW may be controlled.

In FIG. 9(a) or FIG. 9(b) above, as the same TB is repeatedly transmitted through different layer groups and different TRPs/panels transmit each layer group, a data reception probability may be increased and this is referred to as an SDM (spatial division multiplexing) based M-TRP URLLC transmission scheme. Layers which belong to different layer groups are transmitted through DMRS ports which belong to different DMRS CDM groups, respectively.

The UE may be configured/indicated with whether the corresponding transmission is URLLC M-TRP transmission or eMBB M-TRP transmission. For example, as an RNTI configured for a purpose of MTRP-URLLC and an RNTI configured for a purpose of MTRP-eMBB are separately used, the UE may determine/decide whether the corresponding M-TRP transmission is URLLC transmission or eMBB transmission. That is, when CRC masking of the DCI received by the UE is performed by using the RNTI configured for the URLLC M-TRP purpose, this may correspond to the URLLC transmission and when the CRC masking of the DCI is performed by using the RNTI configured for the eMBB M-TRP purpose, this may correspond to the eMBB transmission. Alternatively, the base station may indicate semi-statically through higher layer signaling (e.g., RRC or MAC-CE signaling) or indicate dynamically through DCI, to UE, information representing whether the corresponding transmission is the eMBB M-TRP transmission or the URLLC M-TRP transmission.

When the URLLC M-TRP transmission is configured/indicated to the UE through the higher layer signaling (e.g., RRC or MAC-CE signaling), a specific field of the DCI may be reused for a purpose of a URLLC transmission related configuration/indication.

For example, the specific field of the DCI may be used for a purpose of selecting/indicting by which scheme the URLLC M-TRP transmission is performed among Spatial Division Multiplexing (SDM), Frequency Division Multipelxing (FDM), and Time Division Multiplexing (TDM) schemes. Alternatively, when the URLLC M-TRP transmission scheme is preconfigured as one of the SDM, the FDM, and the TDM, the specific field of the DCI may be used for a purpose of indicating which scheme is used among subdivided schemes in a preconfigured multiplexing scheme. As an example, when the URLLC M-TRP transmission scheme is preconfigured by the SDM scheme, the specific field of the DCI may be used for a purpose of indicating one of the SDM schemes (e.g., scheme 1a/1b/1c, etc.).

As another example, the specific field of the DCI may be used for a purpose of designating how a spatial/frequency/time resource is allocated for each TRP.

Specifically, in the case of the TDM scheme, the specific field of the DCI may be used for a purpose of indicating whether each TRP is to transmit the same TB in different slots or whether each TRP is to transmit the same TB through different OFDM symbols in the same slot. Further, through how many time units the same TB is transmitted (that is, a time unit of transmitting one TB) or an interval between time units and/or a period in which the same TB is transmitted may be indicated by using the specific field of the DCI.

In the case of the FDM, the specific field of the DCI may be used for a purpose of indicating how to designate the RB(s) transmitted by each TRP in all allocated resource blocks (RBs). For example, whether each TRP is to alternately transmit the RB in a comb form in the allocated RB(s) or whether 1/M (M represents the number of TRPs) allocated RBs are to be sequentially allocated from an RB having a low index may be designated (consequently, each TRP may be allocated with RB(s) of the same quantity as or an approximate quantity to allocated RB(s)/M). In addition/alternatively, the specific field of the DCI may be used for a purpose of designating a distritutable minimum unit (e.g., RB/resource block group (RBG)/precoding resource block group (PRG)/group of PRG).

As described above, when the specific field of the DCI is reused for the purpose of the URLLC transmission related configuration/indication, it may be considered that the following field is used. For example, a 'DMRS sequence initialization' field of 1 bit may be reused for the purpose(s). The 'DMRS sequence initialization' field of 1 bit may be used for indicating 0 or 1 of original nSCID, and since quasi-orthogonal MU-MIMO transmission is not required in the URLLC, the 'DMRS sequence initialization' field may be operated by fixing nSCID to 0, and the 'DMRS sequence initialization' field of 1 bit may be reused.

As another example, since a purpose of the URLLC is not increase a throughput, the URLLC may be limited to low rank transmission, and as a result, a current DMRS indication table (i.e., an antenna port indication field) capable of supporting up to a high rank may be abbreviated to a DMRS indication table supporting only a low rank (e.g., rank 2 or less). As a result, a size of the antenna port indication field may decrease, and only some of bits of the existing antenna port indication field may be used for an original purpose and some remaining bits may be reused for the URLLC purpose.

Like this, the existing DCI field is reused for the URLLC purpose, and as a result, the base station may configure/indicate information related to the URLLC to the UE.

Meanwhile, a current TCI field size is limited to 3 bits, and when an M value larger than 2 is supported, more TCI state combinations should be indicated to the UE, so bits 'reserved' for the reuse purpose(s) may also be used for extending the TCI field size in addition to the existing 3-bit TCI field.

The base station may also dynamically indicate the information representing whether the corresponding transmission is the eMBB M-TRP transmission or the URLLC M-TRP transmission through the DCI. A new field of the DCI may also be added in order to indicate/configure whether the corresponding transmission is the eMBB M-TRP transmission or the URLLC M-TRP transmission, but in this case, a DCI payload size varies, and as a result, overhead for DCI blind detection of the UE may increase. Accordingly, it may be preferable to maintain the DCI payload size to be the same as the existing DCI payload size, and to this end, a method for reusing the DCI specific field or a bit number of the specific field and using secured bits may be considered.

For example, a scheme of reusing a Redundancy Version (RV)/Modulation and Coding Scheme (MCS)/New Data Indicator (NDI) field, etc., may be considered. Specifically, when the RV of the M-TRP is the same, RV corresponding to a second codeword of the existing DCI need not be used for an original purpose, and as a result, the RV may be reused for the purpose. Alternatively, since the M-TRP transmits one same TB, only one NDI may be used. In this case, when NDI corresponding to the second codeword of the existing DCI need not be used for the original purpose, the NDI may be reused for the purpose. Similarly even when each TRP uses the same MCS, MCS corresponding to the second codeword of the existing DCI need not be used for the original purpose, and as a result, the MCS may be reused for the purpose. Like this, the existing DCI field is reused, and as a result, the base station may indicate whether the corresponding transmission is eMBB or URLLC to the UE without an increase of control overhead.

In respect to each of the MCS/RV/NDI field, two fields may exist by assuming up to two codewords or one field may exist by assuming one codeword in the existing DCI. In the URLLC transmission scheme, each TRP may be limited to apply the same MCS/RV/NDI, and under such a limitation, only one MCS/RV/NDI field may preferably exist in the DCI.

Further, information representing whether the corresponding transmission is the M-TRP transmission or the existing single TRP transmission may be determined based on the number of TCIs indicated through a transmission configuration indication (TCI) field of the DCI. For example, when the number of TCIs is multiple (e.g., M), the corresponding transmission may be determined/recognized as the M-TRP transmission and when the number of TCIs is 1, the corresponding transmission may be determined/recognized as the single TRP transmission.

Referring to Table 6 above, in Time division multiplexing (hereinafter, referred to as TDM) based URLLC, scheme 3/4 may be considered. Specifically, scheme 4 means a scheme in which one TRP transmits the transport block (hereinafter, referred to as TB) in one slot and has an effect of increasing a data reception probability through the same TB received from multiple TRPs in multiple slots. Unlike this, scheme 3 means a scheme in which one TRP transmits the TB through several consecutive OFDM symbols (i.e., symbol group), and may be configured in such a manner that multiple TRPs transmit the same TB through different symbol groups in one slot.

Hereinafter, scheme 3 is primarily described among the TDM based URLLC M-TRP schemes in the description, but does not limit the technical scope of the present disclosure and the present disclosure may be extensively applied even to scheme 4 and other schemes.

FIG. 10 illustrates an example of 2-TRP transmission in which the same TB is repeatedly transmitted in units of two symbols. That is, it is assumed that two symbols constitute one symbol group. In FIG. 10, a horizontal axis and a vertical axis mean the OFDM symbol and the subcarrier, respectively, and FIG. 10 corresponds to one example of a case where data transmission is allocated to 1 resource block (hereinafter, referred to as RB). FIG. 10 is just one example for convenience of the description and does not limit the technical scope of the present disclosure. Accordingly, the number of symbols constituting the symbol unit (symbol group) of FIG. 10, the number of RBs to which data transmission is allocated, etc., may be diversely changed. Further, the present disclosure is described based on resource element (hereinafter, referred to as RE) mapping of DMRS type 1, but may be applied even to RE mapping of type 2. Further, the present disclosure is described based on operations of two TRPs (e.g., TRP 1 and TRP 2), but may be applied even to two or more, i.e., multiple TRP operations, of course.

TRP 1 and TRP 2 may be configured to transmit the same TB alternately in units of two symbols, and TRP 1 may transmit the DMRS in resource elements (hereinafter, referred to as REs) displayed in a first 2-symbol unit and a third 2-symbol unit in FIG. 10, and TRP 2 may transmit the DMRS in REs displayed in a second 2-symbol unit and a fourth 2-symbol unit in FIG. 10. Data is transmitted through the remaining REs other than the REs displayed in FIG. 10. In this case, each TRP may correspond to a Transmission Configuration Indicator (TCI) one to one, and the UE may be indicated with TCI state 1 and TCI state 2 through the DCI and attempt channel estimation and data decoding by applying the TCI state alternately in units of 2 symbols.

In the present disclosure, a meaning that a specific TCI state is used/applied when receiving data with respect to any frequency/time resource may mean that the channel is estimated from the DMRS by using a QCL type and a QCL RS indicated by the corresponding TCI state, and data is received by the estimated channel.

The base station (or TRP, etc.) may inform the UE of frequency/time resource allocation information through the DCI. When M-TRP transmission in which the same TB is repeatedly transmitted in units of a specific symbol group is considered, the resource allocation information may be transmitted/configured through the following proposal methods (e.g., method 1, method 2, method 3, etc.).

<Method 1>

The base station may inform (the UE) of all resources (e.g., a frequency resource, a time resource, or the frequency and time resources) in which the same TB is repeatedly transmitted through the DCI. For example, when the frequency resource (e.g., RB) is equally allocated to all time resources (e.g., OFDM symbols) to which the data is allocated (i.e., the RBs allocated to respective TRPs are the same), information on all time resources (e.g., S symbols) may be delivered to the UE by the DCI.

Specifically, each TRP may transmit all time resources (i.e., S symbols) indicated by the DCI separately by a predetermined time unit when the frequency resource (e.g., RB) is equally allocated to all time resources (e.g., OFDM symbols) to which the data is allocated. S/(M*R) symbols may be assumed by one time unit. Here, M represents the number of TRPs which participate in (URLLC) transmission, R means the number of times at which one TRP repeatedly transmits the TB within all time resources (S symbols), and the UE may expect that S is configured to a multiple of M*R.

Hereinafter, in the present disclosure, a time unit (TU) may mean a resource (or a resource set) of the time domain used for transmitting one TB. For example, one time unit may be constituted by one or more symbols, slots, or sub-slots. In the present disclosure, an example in which one time unit is constituted by one or more symbols is primarily described, but does not limit the technical scope of the present disclosure.

Since one TB is transmitted in one time unit, and the same TB is transmitted in all time units, the UE may receive M*R same TBs. In this case, the base station may indicate/configure information on R (i.e., information on the number of times of repeated transmission of the same TB by one TRP) to the UE semi-statically through higher layer signaling (e.g., RRC/MAC-CE, etc.) or dynamically indicate the information through the DCI, etc.

Further, M TRPs may be sequentially alternately allocated with the time units from a front time unit. That is, a j-th TRP may be allocated with an i*M+j (i=0, 1, 2, ..., R−1)-th time unit. The UE may be configured to be indicated with M TCI states through a TCI code point of the DCI, and to attempt channel estimation and data reception by using a j-th TCI in the i*M+j (i=0, 1, 2, ..., R−1)-th time unit (the j-th TCI may correspond to a j-th TRP).

<Method 2>

The base station may inform of a frequency and/or time resource (e.g., t symbols) in which one TB (e.g., a first transmitted TB) is transmitted through the DCI. That is, the base station may transmit resource information constituting one time unit.

For example, when all repeated transmitted TBs are same for the frequency resource (e.g., allocated RBs are same), each TRP may calculate the time resource for transmitting the same TB as follows. When t symbols are defined by one time unit, a total of M*R time units may be allocated (M represents the number of TRPs and R represents the number of times of repeated transmission of the same TB by one TRP), and M TRPs may be sequentially alternately allocated the time units from the front time unit. That is, the j-th TRP may be allocated with the i*M+j (i=0, 1, 2, ..., R−1)-th time unit. In this case, the UE may be configured to be indicated with M TCI states through a TCI code point of the DCI, and to attempt channel estimation and data reception by using a j-th TCI in the i*M+j (i=0, 1, 2, ..., R−1)-th time unit.

In this case, the base station may indicate/configure information on an interval of the OFDM symbol between contiguous time units to the UE semi-statically through higher layer signaling (e.g., RRC/MAC-CE, etc.) or dynamically indicate the information through the DCI, etc. As an example, when a symbol interval between time units is 0, the contiguous time unit is transmitted immediately (continuously) in the time axis as illustrated in FIG. 10.

<Method 3>

When a same precoder is used between time units using the same TCI state (i.e., time unit transmitted by the same TRP) in FIG. 10, the UE may enhance channel estimation accuracy through channel interpolation between the time units. To this end, the base station may configure contiguous time units among the time units using the same TCI state as a group (may be expressed as a time unit bundling), and inform the UE that the same precoder is used for a same Precoding Resource block Group (PRG) even though the time units are different in the group. For convenience of description, the group constituted by the time units (e.g., resource sets) using the same TCI state is referred to as a time unit group (e.g., resource set group).

For example, the time unit group may be configured as one group of n time units from the front time unit (in the order of the time axis) among the time units using the same TCI state. Information on the n (i.e., information on the number of time units constituting one time unit group) may be delivered to the UE through signaling (e.g., RRC/DCI signaling, etc.) by the base station. Alternatively, a method for configuring all of the time units using the same TCI state as one group may also be considered. The UE assumes that the same precoder is applied to all time units (for the same PRG) which belong to the same group among the time units using the same TCI state.

When the time unit bundling (i.e., the same precoder is used) is applied to the time units using the same TCI state as described above, the channel estimation accuracy may be enhanced or the DMRS overhead may be reduced through the following schemes (hereinafter, method 3-1), method 3-2), method 3-3), etc.).

Meanwhile, as the TCI state is alternately applied for each time unit, a time interval of a minimum of m symbols exists between the time units using the same TCI state. For example, the time interval between m symbols may be an interval between a last symbol of an i-th time unit and a first symbol of an i+1-th time unit included in the same time unit group. As an example, in FIG. 10, m=2. When a value of m is large, channel time variance between the time units using the same TCI state is large, so an effect of channel accuracy enhancement due to the time unit bundling may deteriorate. Accordingly, only when m is equal to or less than a specific value (e.g., m≤2), it may be preferable to apply the time unit bundling. A method for configuring information on the specific value (interval information between the time units to which the time unit bundling may be applied) to be indicated to the UE through the signaling (e.g., RRC/DCI signaling, etc.) by the base station or a value (i.e., a predefined value) fixed to the specific value to be used.

Hereinafter, when the time unit bundling is applied (i.e., when a time unit group including a plurality of time units for applying the same TCI state is configured), i) a method for further enhancing the channel estimation accuracy by adjusting a DMRS RE pattern (e.g., method 3-1), a method for increasing a data reception probability by transmitting data instead of some DMRSs (e.g., method 3-2, method 3-3, etc.) are proposed through FIGS. 11 to 13.

Method 3-1)

FIG. 11 illustrates an example of 2-TRP transmission in which the same TB is repeatedly transmitted in units of two symbols based on DMRS CDM group shifting proposed in the present disclosure. FIG. 11 is just one example for convenience of the description and does not limit the technical scope of the present disclosure. Accordingly, the number of symbols constituting the symbol unit (symbol group) of FIG. 11, the number of RBs to which data transmission is allocated, etc., may be diversely changed. Further, the present disclosure is described based on RE mapping of DMRS type 1, but may be applied even to RE mapping of type 2, of course. Further, the present disclosure is described based on operations of two TRPs, but may be applied even to two or more, i.e., multiple TRP operations, of course.

In FIG. 11, the DMRS is transmitted for each time unit, and since time variance of the channel is small when the time interval between the time units using the same TCI state, and as a result, the channel estimation accuracy due to the channel interpolation may be enhanced by changing and using a DMRS Code Division Multiplexing (CDM) group as illustrated in FIG. 11. Through this, there is an advantage in that the data reception probability may be enhanced. In FIG. 11, it is assumed and described that there are two time units using the same TCI state (i.e., it is assumed that two time units are included in one time unit group), but the corresponding scheme may be equally extensively applied even when the number of unit times is K (K is an integer of 2 or more), of course.

For example, the base station/UE may transmit/receive the DMRS by using that the i-th time unit using the same TCI state is a CDM group (i−1)% (the number of DMRS CDM groups (e.g., the number of type 1 DMRSs is 2 and the number of type 2 DMRSs is 3)). As a specific example, when it is assumed that the number of time units using the same TCI state is 4 (e.g., TUs, 1, 2, 3, and 4), in the case of DMRS type 1 for corresponding TUs 1, 2, 3, and 4, CDM groups corresponding to respective TUs may be used as group 0, group 1, group 0, and group 1, and in the case of DMRS type 2, the respective CDM groups may be used as group 0, group 1, group 2, and group 0. In this case, the base station may indicate/configure, to the UE, information on ON/OFF of the CDM group shift operation through the signaling (e.g., RRC/DCI, etc.).

Method 3-2)

FIG. 12 illustrates an example of 2-TRP transmission in which the same TB is repeatedly transmitted in units of two symbols based on DMRS removing (omission) proposed in the present disclosure. FIG. 12 is just for convenience of the description and does not limit the technical scope of the present disclosure. Accordingly, the number of symbols constituting the symbol unit (symbol group) of FIG. 12, the number of RBs to which data transmission is allocated, etc., may be diversely changed. Further, the present disclosure is described based on RE mapping of DMRS type 1, but may be applied even to RE mapping of type 2. Further, the present disclosure is described based on operations of two TRPs, but may be applied even to two or more, i.e., multiple TRP operations, of course.

In FIG. 10 described above, the DMRS is transmitted for each time unit, and the time variance of the channel is small when the time interval between the time units for using the same TCI state is small, so the base station (or TRP) may be configured to transmit data in the resource allocated for the DMRS without transmitting the DMRS in some time units among the time units using the same TCI state as illustrated in FIG. 12. Through this, there is an advantage in that the TB may be transmitted with higher reliability by lowering a code rate in a time unit in which the DMRS is not transmitted. In FIG. 12, it is assumed and described that there are two time units using the same TCI state (i.e., it is assumed that two time units are included in one time unit group), but the corresponding scheme may be equally extensively applied even when the number of unit times is K (K is an integer of 2 or more), of course.

For example, the base station may transmit the DMRS in a P*i+1-th time unit among the bundled time units (i.e., a time unit group to which the same TCI state and the same precoder are applied), and transmit data without transmitting the DMRS in the remaining time units. Here, P represents a period of the time unit in which the DMRS is transmitted among the bundled time units. Alternatively, on the contrary, the base station may transmit data without transmitting the DMRS in the P*i+k (k≠1)-th time unit (i=0, 1, 2, . . . ) and also transmit the DMRS in the remaining time units.

For example, when B time unit groups are configured through bundling of the time units to which the same TCI state and the same precoder are applied (B represents the number of time unit groups), an order (index) of each time unit may be represented as in B*i+d (i=0, 1, 2, . . . , x−1) (x represents the number of time units included in one time unit group, d represents a d-th time unit group (an index of the time unit group)), and in each time unit group, the DMRS may be transmitted in a time unit when i=0 and the data may be transmitted instead of the DMRS in the remaining time units.

In this case, the base station may indicate/configure, to the UE, information on ON/OFF of the DMRS removing/omission operation (i.e., an operation of transmitting the data instead of the DMRS) or a P value through the signaling (e.g., RRC/DCI, etc.).

Further, in the case of Resource allocation type 1, a frequency diversity gain may be obtained through interleaving in a step of mapping a Virtual Resource Block, hereinafter, referred to as VRB) to a Physical resource block (hereinafter, referred to as PRB). In TDM based URLLC transmission, the frequency diversity gain may be enhanced through different interleaving (i.e., VRB to PRB mapping) for each time unit, and as a result, the data reception probability may increase. For example, a method may be considered in which the VRB to PRB mapping is changed between the time units using the same TCI state to transmit the same TB by using different PRBs between a time unit i and a time unit i+1 included in one time unit group.

In the NR standard, two schemes, i.e., resource allocation type 0 and type 1 are supported, and the base station indicates, to the UE, which scheme is used. In the case of Type 1, a start RB of resource allocation and the number of RBs to which the resource is allocated in the VRB are notified, and the UE is allocated with resources which are as many as allocated RBs by starting from the start RB on the VRB. When interleaving is activated, VRB i is mapped to PRB j by a specific calculation equation, and when the interleaving is deactivated (i.e., non-interleaved mapping), VRB i is equally mapped to PRB i.

Method 3-3)

The data may be transmitted instead of transmitting the DMRS in some DMRS resource elements (REs) corresponding to some DMRS symbols in a specific time unit. Further, only some of RE(s) of a specific DMRS port are transmitted in each time unit in the time unit group and the remaining REs are used for data transmission to reduce a DMRS density.

FIG. 13 illustrates an example of lowering a DMRS RE density in each time unit proposed in the present disclosure, but changing and transmitting a location of a transmitted DMRS RE for each time unit. FIG. 13 is just one example for convenience of the description and does not limit the technical scope of the present disclosure. Accordingly, the number of symbols constituting the symbol unit (symbol group) of FIG. 13, the number of RBs to which data transmission is allocated, etc., may be diversely changed. Further, the present disclosure is described based on RE mapping of DMRS type 1, but may be applied even to RE mapping of type 2. Further, the present disclosure is described based on operations of two TRPs, but may be applied even to two or more, i.e., multiple TRP operations, of course.

For example, in the related art, a subcarrier per RB in the DMRS symbol in type 1 DMRS transmits the DMRS in {0, 2, 4, 6, 8, 10}, but in the proposed scheme, the DMRS may be transmitted only in some (e.g., {0, 4, 8}) of the subcarriers. Additionally, it may be effective to channel estimation that the DMRS is transmitted in the subcarriers {0, 4, 8} in a first time unit which exists in the time unit group and the DMRS is transmitted in the subcarriers {2, 6, 10} in a subsequent time unit to change the RE for transmitting the DMRS between the time units. That is, a DMRS RE density is lowered in each time unit proposed in the present disclosure, but a location of a transmitted DMRS RE may be changed for each time unit. Representatively, a scheme of interlacing the location of the DMRS RE as the time unit increases may be considered.

Further, as in method 3-2, method 3-3, etc., described above, in relation to the operation of transmitting the data instead of the DMRS, an operation of sending the data instead of the DMRS may not be performed in the first time unit and the last time unit which exist in the time unit group in order to secure a channel estimation capability.

Alternatively, the base station may inform the UE of in which time unit the operation of sending the data instead of the DMRS is performed among the time units which exist in the time unit group through bitmap type signaling. As an example, when the number of time units which exist in the time unit group is 10, whether to apply the DMRS removing/omission operation (i.e., the operation of transmitting the data instead of the DMRS) may be indicated/configured in each time unit.

As a method for determining the DMRS symbol location in the time units which exist in the time unit group, a method for configuring the DMRS symbol location in Resource allocation type A of the Rel-15 NR standard in the related art may be used. In Resource allocation type A, a front loaded DMRS location is configured through the RRC and an additional DMRS location is determined according to the number of additional DMRSs configured through the RRC and an OFDM symbol duration of the data. The OFDM symbol duration of the time unit group is defined as a start time of a first time unit (TU) and a last time of a last TU constituting the time unit group. For example, in the example of FIG. 10, each time unit group is constituted by two time units, and the OFDM symbol duration of onetime unit group is 6 OFDM symbols. The DMRS symbol location may be determined in Resource allocation type A by using the front loaded DMRS location configured to the UE through the RRC and the number of additional DMRSs configured through the RRC, and assuming the OFDM symbol duration of the time unit group as an OFDM symbol duration of the data. A case where the DMRS symbol is defined in the OFDM symbol other than the time unit constituting the time unit group may be ignored, and only the DMRS symbol defined in the time unit constituting the time unit group may be determined as a final DMRS symbol.

In proposal method 3, proposal method 3-1, proposal method 3-2, proposal method 3-3, etc., described above, a different DMRS port or a different DMRS CDM group may be used for each TRP. As the resulting effect, scheduling flexibility for multiple users (MU) for each TRP may be enhanced.

For example, TRP 1 repeatedly transmits the same TB by using a first port of CDM group #0 and TRP 2 repeatedly transmits the same TB by using a first port of CDM group #1. To this end, when one port is indicated in the DCI, the corresponding port may be construed to mean a local index in each CDM group. For example, if port 0 is indicated in the DCI, and CDM group 0={port 0, 1} and CDM group 1={port 2, 3} are defined, TRP 1 uses port 0 in CDM group 0 and since port 0 corresponds to the first port in CDM group 0, TRP 2 uses port 2 corresponding to the first port in CDM group 1. Alternatively, a port to be used in each TRP may be together indicated by extending a (DMRS) antenna port indication in the DCI.

In the above-described methods, two symbols are configured as one time unit, and the operation of scheme 3 is described as an example, but the above-described methods may be extensively applied even though random x symbol(s) is configured in one time unit, and the methods may be applied even to scheme 4 mentioned above, of course.

<Method 4>

For channel estimation capability enhancement and DMRS overhead reduction, the base station may configure, to the UE, whether the proposed method (e.g., method 3/method 3-1/method 3-2/method 3-3, etc.) is to be used, and/or whether to permit the channel interpolation between the time units of the same time unit group, and/or whether to use the same precoder for the same PRG between the time units of the same time unit group through separate RRC signaling. For convenience of description, the RRC signaling is referred to as time domain channel interpolation ON/OFF signaling. However, such a name does not limit the technical scope of the present disclosure.

Based on the time domain channel interpolation signaling, the locations of the time units to which the same TCI state is applied may be determined. In other words, a specific TCI state may be mapped to the time unit according to a mapping rule determined based on the signaling.

For example, when the time domain channel interpolation is ON (i.e., configured to be ON), the time units to which the same TCI state is applied may be consecutively arranged. In addition/alternatively, the same TCI state may be applied/mapped to a plurality of consecutive time units. As a specific example, when 4 time units each constituted by 2 symbols exist in one slot (as an example, time units 1, 2, 3, and 4 are constituted by OFDM symbols (0,1), (3,4), (6,7), and (9,10)), and two TCI states are indicated, a first TCI state may be mapped to consecutive time units 1 and 2 and a second TCI state may be mapped to consecutive time units 3 and 4. Through the mapping, the time units using the same TCI state (i.e., to which the same TCI state is mapped) may be localized in the time axis. In this case, there is an effect that the channel estimation capability is enhanced or the DMRS overhead is reduced through the channel interpolation between the time units using the same TCI state.

For example, when the time domain channel interpolation is OFF (i.e., when the time domain channel interpolation is configured to OFF), the TCI state may be circularly shifted and mapped as the order (index) of the time unit increases. In addition/alternatively, the TCI state is differently applied for each time unit, but as the time unit is changed on the time axis, the TCI state may be circularly shifted and mapped as the time unit is changed on the time axis.

As a specific example, when 4 time units each constituted by 2 symbols exist in one slot (as an example, time units 1, 2, 3, and 4 are constituted by OFDM symbols (0,1), (3,4), (6,7), and (9,10)), and two TCI states are indicated, a first TCI state may be mapped to consecutive time units 1 and 3 and a second TCI state may be mapped to consecutive time units 2 and 4. Since the time domain channel interpolation is OFF, the time units mapped to the same TCI state may be distributed and configured. In this case, there is an effect that a time diversity gain may be obtained to the maximum even for data mapped to the same TCI state.

Meanwhile, in the above-described method, it is proposed that as the time domain channel interpolation is On/Off, a TCI state mapping rule is changed, but on the contrary, it may be assumed that the UE designates a TCI state mapping rule and uses the same precoder for the same Precoding Resource block Group (PRG) between the time units of the same time unit group according to the mapping rule.

For example, when the time units to which the same TCI state is applied are consecutively arranged, the UE assumes that the same precoder is used for the same PRG between the time units (i.e., the time units using the same TCI state) of the same time unit group. If the TCI state is circularly shifted and mapped as the time unit increases, the UE does not assume that the same precoder is used for the same PRG between the time units (i.e., the time units using the same TCI state).

Similarly to this, the base station may designate the TCI state mapping rule and determine the proposed DMRS configuration scheme according to the mapping rule. For example, when the time units to which the same TCI state is applied are consecutively arranged, the DMRS may be configured according to the methods such as method 3-1/3-2/3-3, etc., described above. Specifically, when the time units to which the same TCI state is applied are consecutively arranged, DMRS CDM group shifting is applied between the consecutive time units, and as a result, a DMRS pattern of each time unit may not be overlapped or the DMRS may be transmitted only in a first time unit among the consecutive time units, and the DMRS may not be transmitted in a subsequent time unit or only some DMRSs may be transmitted in each time unit.

<Method 5>

The method using the localized mapping scheme (i.e., a scheme in which the time units using the same TCI state are localized on the time axis) or the distributed mapping scheme according to the On/Off of the time domain channel interpolation in Method 4 in Method 4 described above has been described. Similarly to this, according to the On/Off of the frequency hopping, when the frequency hopping is off, the localized mapping scheme may be used and when the frequency hopping is on, the distributed mapping scheme may be used.

For example, when the frequency hopping is off, all repeatedly transmitted PDSCH time units are scheduled with the same RB. Accordingly, the channel estimation accuracy may be increased by using the localized scheme. On the contrary, when the frequency hopping is on, repeatedly transmitted adjacent PDSCH time units are scheduled with different RBs. For example, non-hopping RB, hopping RB, non-hopping RB, and hopping RB are scheduled for time units 1, 2, 3, and 4, respectively. In this case, even though the localized mapping scheme is used, RBs between adjacent time units (TUs) are different, and as a result, the channel estimation accuracy may not be increased. Accordingly, the distributed mapping scheme may be used.

As a contrary example, when the frequency hopping is off, the distributed mapping scheme may be used and when the frequency hopping is on, the localized mapping scheme may be used. When the hopping is off, a TRP that transmits the PDSCH time unit is rapidly changed by using the distributed mapping scheme to rapidly obtain the diversity gain. On the contrary, when the hopping frequency is on, if the localized mapping scheme is used, an RB transmitted by one TRP is diversified as a hopping or non hopping RB to obtain the frequency diversity gain in terms of the corresponding TRP.

Alternatively, the base station may indicate the TCI state mapping scheme to the UE and turn on/off the frequency hopping according to the indicated scheme. For example, when the localized scheme is indicated, the channel estimation accuracy may be increased by turning off the frequency hopping and when the distributed mapping scheme is indicated, the frequency hopping may be turned on. Alternatively, on the contrary, when the localized scheme is indicated, the frequency hopping may be turned on and when the distributed mapping scheme is indicated, the frequency hopping may be turned off.

When the base station repeatedly transmits, to the UE, the PDSCH in order to increase a reception success rate, scheme 2a/2b in which the PDSCH is FDMed and repeatedly or scheme 3/4 in which the PDSCH is TDMed and repeatedly transmitted may be configured. In this case, in scheme 4, the PDSCH is repeatedly transmitted as large as an RepNum value (e.g., the number of repetition times) defined in a TDRA field of the DCI by slot level PDSCH repeated transmission. For example, in the case of RepNum=2, since the same PDSCH is transmitted in each of two consecutive slots, the PDSCH is transmitted a total of two times. When Scheme 2a/2b/3 (or expressed as FDMSchemeA, FDMSchemeB, or TDMSchemeA) is indicated, if RepNum (>2) is indicated through the TDRA, it is unclear whether the UE should recognize this as scheme 4 transmission, whether the UE should recognize this as Scheme 2a/2b/3, or whether the UE should recognize this as scheme 4+Scheme 2a/2b/3 in which two transmission techniques are combined. Accordingly, in this case, the UE may ignore the RepNum of the TDRA field.

The proposal of the present disclosure is described with the PDSCH as an example, but may be extensively applied when the corresponding channel is repeatedly transmitted even for other channels PUSCH/PUCCH/PDCCH.

The proposal methods (e.g., Proposal 1/2/3/3-1/3-2/3-3/4/5, etc.) are described based on multiple TRPs, but this may be equally applied even to transmission through multiple panels.

FIG. 14 illustrates signaling when the UE receives a single DCI (i.e., when one TRP transmits the DCI to the UE) in a situation of M-TRP (alternatively, M-cells, hereinafter, all TRPs may be replaced with the cells or even when multiple CORERSETs (/CORESET groups) are configured from one TRP, the corresponding TRP may be assumed as M-TRP). In FIG. 14, for convenience of description, signaling between two TRPs and the UE is considered, and a case where TRP 1 is a representative TRP transmitting the DCI is assumed. FIG. 14 is just for convenience of the description and does not limit the technical scope of the present disclosure. Accordingly, FIG. 14 may be extensively applied to operations with multiple, i.e., two or more TRPs. Some step(s) illustrated in FIG. 14 may be omitted according to a situation and/or a configuration.

In the following description, the network side may be one base station including a plurality of TRPs, and may be one cell including the plurality of TRPs. As an example, ideal/non-ideal backhaul may also be configured between TRP 1 and TRP 2 constituting the network side. Further, in the following description, the network side is described based on "TRP", but as described above, "TRP" may be replaced with expressions including a panel, an antenna array, a cell (e.g., macro cell/small cell/pico cell), a transmission point (TP), a base station (gNB, etc.), etc., and applied.

As described above, the TRP may be distinguished according to information (e.g., an index or ID) on a CORESET group (or CORESET pool). As an example, when one UE is configured to perform transmission/reception with multiple TRPs (or cells), this may mean that multiple CORESET groups (or CORESET pools) are configured for one UE. The configuration for the CORESET group (or CORESET pool) may be performed through the higher layer signaling (e.g., RRC signaling).

The UE may receive configuration information related to multiple TRP based transmission and reception from the network side through/using TRP1 (and/or TRP2) (S1405). That is, the Network side may transmit configuration information related to multiple TRP based transmission and reception to the UE through/using TRP1 (and/or TRP2) (S1405). The configuration information may include information related to a configuration (i.e., TRP configuration) of the network side, resource information (resource allocation) related to the multiple TRP based transmission and reception, etc. The configuration information may be transferred through higher layer signaling (e.g., RRC signaling, MAC-CE, etc.). In addition, when the configuration information is pre-defined or pre-configured, the corresponding step may be omitted.

For example, the configuration information may include a configuration related to schemes described in the proposed method (e.g., method 1/2/3/3-1/3-2/3-3/4/5, etc.), etc. As an example, the configuration information may include a configuration related to the time domain channel interpolation ON/OFF, a configuration related to the frequency hopping ON/OFF, etc. The TCI state mapping scheme (e.g., distributed mapping/localized mapping) may be configured based on the configuration related to the time domain channel interpolation ON/OFF or the configuration related to the frequency hopping ON/OFF.

For example, the operation of the UE (100/200 in FIGS. 17 to 21) which receives the multiple TRP based transmission and reception related configuration information from the network side (100/200 in FIGS. 17 to 21) in step S1405 described above may be implemented by devices in FIGS. 17 to 21 to be described below. For example, referring to FIG. 18, one or more processors 102 may control one or more transceivers 106 and/or one or more memories 104 so as to receive the multiple TRP based transmission and reception related configuration information, and one or more transceivers 106 may receive the multiple TRP based transmission and reception related configuration information from the network side.

Likewise, the operation of the network side (100/200 in FIGS. 17 to 21) which transmits the multiple TRP based transmission and reception related configuration information to the UE (100/200 in FIGS. 17 to 21) in step S1405 described above may be implemented by the devices in FIGS. 17 to 21 to be described below. For example, referring to FIG. 18, one or more processors 102 may control one or more transceivers 106 and/or one or more memories 104 so as to transmit the multiple TRP based transmission and reception related configuration information, and one or more transceivers 106 may transmit the multiple TRP based transmission and reception related configuration information from the network side.

The UE may receive, from the network side, DCI and Data 1 scheduled by corresponding DCI through/using TRP 1 (S1410-1). Further, the UE may receive, from the network side, Data 2 through TRP 2 (S1410-2). That is, the network side may transmit, to the UE, DCI and Data 1 scheduled by corresponding DCI through/using TRP 1 (S1410-1). Further, the network wide may transmit, to the UE, Data 2 through TRP 2 (S1410-2). Here, the DCI may be configured to be used for scheduling both Data 1 and Data 2. Further, for example, DCI and Data (e.g., Data 1, Data 2) may be transferred through a control channel (e.g., PDCCH, etc.) and a data channel (e.g., PDSCH, etc.), respectively. For example, Data (e.g. Data 1, Data 2) may include a DMRS and data. Further, steps S1410-1 and S1410-2 may be simultaneously performed or any one may be performed earlier than the other one.

For example, the DCI may include information on the TCI state, resource allocation information for the DMRS and/or the data (i.e., the frequency resource, the time resource, or the frequency and time resources), etc., described in the proposed method (e.g., method 1/2/3/3-1/3-2/3-3/4/5, etc.). In this case, Data 1 and Data 2 may be mapped to the resource area by the scheme described in the proposed method (e.g., method 1/2/3/3-1/3-2/3-3/4/5, etc.), and transmitted and received. For example, the frequency hopping may be turned on/off based on the TCI state mapping scheme indicated/configured from the network side.

Information required for performing each method described in the above-described methods (e.g., method 1/2/3/3-1/3-2/3-3/4/5, etc.) may be delivered through higher layer signaling (e.g., step S1405) and/or physical layer signaling (e.g., step S1410-1 or S1410-2). For example, time unit related configuration information (e.g., a duration of the OFDM symbol between adjacent time units, a duration of the OFDM symbol between the time units using the same TCI state, etc.), whether the same precoder is applied to a plurality of time units (e.g., resource sets) included in the same time unit group (e.g. resource set group), information on whether to perform DMRS omission (i.e., the operation of transmitting/receiving the data instead of the DMRS), repeated transmission related information of the transport block (e.g., the number of repeated transmission times), whether the frequency hopping is activated, whether the DMRS CDM group shift is applied, etc., may be delivered through the RRC signaling and/or DCI.

For example, the data (e.g., Data 1 and Data 2) may be encoded from the same transport block. Further, the data (e.g., Data 1 and Data 2) may be received in the time units included in the same time unit group, and received based on the same TCI state. Further, for example, as described in the above-described proposed method (e.g., method 3/3-1/3-2/3-3, etc.), the operation such as the DMRS CDM group shift/DMRS omission between respective DMRSs included in each DATA may be applied.

For example, the operation of the UE (100/200 in FIGS. 17 to 21) which receives the DCI and/or the Data 1 and/or the Data 2 from the network side (100/200 in FIGS. 17 to 21) in step S1410-1/S1410-2 described above may be implemented by devices in FIGS. 17 to 21 to be described below. For example, referring to FIG. 18, one or more processors 102 may control one or more transceivers 106 and/or one or more memories 104 so as to receive the DCI and/or the Data 1 and/or the Data 2, and one or more transceivers 106 may receive the DCI and/or the Data 1 and/or the Data 2 from the network side.

Likewise, the operation of the network side (100/200 in FIGS. 17 to 21) which transmits the DCI and/or the Data 1 and/or the Data 2 to the UE (100/200 in FIGS. 17 to 21) in step S1410-1/S1410-2 described above may be implemented by the devices in FIGS. 17 to 21 to be described below. For example, referring to FIG. 18, one or more processors 102 may control one or more transceivers 106 and/or one or more memories 104 so as to transmit the DCI and/or the Data 1 and/or the Data 2, and one or more transceivers 106 may transmit the DCI and/or the Data 1 and/or the Data 2 from the network side.

The UE may decode Data 1 and Data 2 received from TRP 1 and TRP 2 (S1415). For example, the UE may decode Data 1/Data 2 based on the above-described proposal method (e.g., Method 1/2/3/3-1/3-2/3-3/4/5, etc.).

For example, the operation of the UE (e.g., reference numeral 100/200 of FIGS. 17 to 21) which decodes Data 1 and Data 2 in step S1415 described above may be implemented by the devices of FIGS. 17 to 21 to be described below. For example, referring to FIG. 18, one or more processor 102 may control one or more memories 104 to perform the operation of decoding Data 1 and Data 2.

The UE may transmit, to the network side, HARQ-ACK information (e.g., ACK information, NACK information, etc.) for Data 1 and/or Data 2 above through/using TRP 1 and/or TRP 2 (S1420-1 and S1420-2). That is, the network side may receive, from the UE, HARQ-ACK information (e.g., ACK information, NACK information, etc.) for the DCI and/or Data 1 and/or Data 2 above through/using TRP 1 and/or TRP 2 (S1420-1 and S1420-2).

For example, the HARQ-ACK information for Data 1 and/or Data 2 may be combined into one or separated. Further, the UE may be configured to transmit only HARQ-ACK information to representative TRP (e.g., TRP 1), and transmission of the HARQ-ACK information to the other TRP (e.g., TRP 2) may also be omitted.

For example, the operation of the UE (100/200 in FIGS. 17 to 21) which transmits the HARQ-ACK information for Data 1 and/or Data 2 to the network side (100/200 in FIGS. 17 to 21) through one or more PUCCHs in step S1420-1/S1420-2 described above may be implemented by the devices in FIGS. 17 to 21 to be described below. For example, referring to FIG. 18, one or more processors 102 may control one or more transceivers 106 and/or one or more memories 104 to transmit the HARQ-ACK information for Data 1 and/or Data 2 through one or more PUCCHs, and one or more transceivers 106 may transmit, to the network side, the HARQ-ACK information for Data 1 and/or Data 2 through one or more PUCCHs.

Likewise, the operation of the network side (100/200 in FIGS. 17 to 17) which receives the HARQ-ACK information for Data 1 and/or Data 2 from the UE (100/200 in FIGS. 17 to 21) through one or more PUCCHs in step S1420-1/S1420-2 described above may be implemented by the devices in FIGS. 17 to 21 to be described below. For example, referring to FIG. 18, one or more processors 102 may control one or more transceivers 106 and/or one or more memories 104 to receive the HARQ-ACK information for Data 1 and/or Data 2, and one or more transceivers 106 may receive, from the UE, the HARQ-ACK information for Data 1 and/or Data 2 through one or more PUCCHs.

In FIG. 14 described above, the methods are described based on a single DCI based M-TRP operation is primarily described, but in some cases, the methods may be applied even to a multi-DCI based M-TRP operation.

FIG. 15 illustrates an example of a flowchart of a data transmission/reception operation of a user equipment (UE) to which the method (e.g., method 1/2/3/3-1/3-2/3-3/4/5, etc.) proposed in the present disclosure may be applied. The UE may be supported by a plurality of TRPs, and ideal/non-ideal backhaul may be configured among the plurality of TRPs. FIG. 15 is just for convenience of the description and does not limit the scope of the present disclosure. Further, some step(s) illustrated in FIG. 15 may be omitted according to a situation and/or a configuration.

As described above, "TRP" may be replaced with expressions including a panel, an antenna array, a cell (e.g., macro cell/small cell/pico cell), a transmission point (TP), a base station (gNB, etc.), etc., and applied. Further, the TRP may be distinguished according to information (e.g., an index or ID) on a CORESET group (or CORESET pool). As an example, when one UE is configured to perform transmission/reception with multiple TRPs (or cells), this may mean that multiple CORESET groups (or CORESET pools) are configured for one UE. The configuration for the CORESET group (or CORESET pool) may be performed through the higher layer signaling (e.g., RRC signaling).

The UE may receive configuration information (S1510). The configuration information may include resource allocation information related to a plurality of resource set groups. Each resource set group may include a plurality of resource sets. For example, the resource set group may corresponding to the time unit group, and each resource set of the plurality of resource sets may correspond to a time unit (e.g., a symbol group, a symbol set, etc.). Each resource set may be constituted by one of one or more symbols, sub-slots, or slots. For example, the configuration information may include information related to the interval between the time units included in the time unit group.

The UE may receive information indicating whether the same precoder is applied to the plurality of resource sets included in the same resource set group. Further, the UE may also receive bitmap type information related to DMRS omission (i.e., the operation of transmitting/receiving the data instead of the DMRS). In addition, the UE may also receive information related to activation of the frequency hopping. Further, the UE may also receive information on the number of times at which the transport block is repeatedly transmitted. For example, each information described above may be included in the configuration information or received through separate signaling.

For example, all resources for data reception of the UE may be allocated based on the resource allocation information, and resource units constituting each resource set may be calculated based on the information on the number of times at which the transport block is repeatedly transmitted and the number of multiple resource set groups.

Further, for example, the plurality of resource sets included in the same resource set group may be consecutively positioned in the time domain based on the resource allocation information. This may correspond to the localized mapping scheme of the description. Alternatively, the plurality of resource sets included in each resource set group may be positioned in a cyclic shift form in the time domain. This may correspond to the distributed mapping scheme of the description. For example, a mapping relation between each time unit and QCL related information (e.g., TCI state) may be configured based on the resource allocation information.

The UE may recognize that the same precoder is applied to the plurality of resource sets based on that the plurality of resource sets are consecutively located in the time domain. Further, whether the frequency hopping is activated may also be determined based on locations of the plurality of resource sets in the time domain (as an example, based on whether the plurality of resource sets is located by the localized mapping scheme or the distributed mapping scheme).

The UE may further receive a unit (e.g., a slot, a symbol, etc.) in which the transport block is repeatedly transmitted, the number of resources (e.g., symbols) constituting one resource set (e.g., time unit), an interval between resource sets associated with the same QCL related information, and/or period information, and as an example, the existing DCI field may be used.

For example, the operation of the UE (e.g., reference numeral 100 and/or 200 of FIGS. 17 to 21) which receives the configuration information in step S1510 described above may be implemented by the devices of FIGS. 17 to 21 to be described below. For example, referring to FIG. 18, one or more processors 102 may control one or more transceivers 106 and/or one or more memories 104 so as to transmit the configuration information and one or more transceivers 106 may receive the configuration information.

The UE may receive a first demodulation reference signal (DMRS) and first data from a first resource set (S1520). The first DMRS and/or the first data may be received based on the QCL related information.

The UE may receive a second DMRS and second data from a second resource set (S1530). The second DMRS and/or the second data may be received based on the QCL related information.

For example, the first resource set and the second resource set may be included in the same resource set group, and QCL related information associated with the respective resource sets included in the same resource set group may be same. That is, the first DMRS and/or the first data, and the second DMRS and/or the second data may be received based on the same QCL related information. This may mean that the same QCL relation is applied based on the same QCL related reference signal, and the DMRS and/or the data are received. As an example, the QCL related information may correspond to a TC state including a QCL related reference signal, a QCL type, etc.

The first data and the second data may be included in the same transport block. That is, the first data and the second data may be encoded from the same transport block.

Further, for example, as described methods (e.g., method 3/3-1/3-2/3-3, etc), a location of a frequency resource from which the second DMRS is received may not be overlapped by being shifted from a location of a frequency resource from which the first DMRS is received. That is, the accuracy of the channel estimation may be enhanced based on that a location/pattern of the frequency resource (e.g., RE) of the DMRS is changed.

As another example, the second DMRS may be omitted and not transmitted (received) in the second resource set. In this case, the second data may be received from a resource location of the second DRMS. Alternatively, the first DMRS may be omitted in some of the frequency resources of the first DMRS, and instead, the first data may be received, and the second DMRS may be omitted in some of the frequency resources of the second DMRS, and instead, the second data may be received. Through this, a data reception success probability may be enhanced. The operation of transmitting the data instead of omission the DMRS may not be performed in a first resource set and a last resource set among a plurality of resource sets included in the same resource set group. Alternatively, whether the DMRS is omitted in the plurality of resource sets may be configured based on the bitmap type information related to the DMRS omission.

The same precoder may be applied to the plurality of resource sets included in the same resource set group. This may mean that the data received from the plurality of resource sets may be decoded based on the same precoder. Further, the plurality of resource sets may be consecutively located in the time domain based on that the same precoder is applied to the plurality of resource sets. In other words, the same QCL related information may be applied (as an example, the same TCI state may be mapped) to the plurality of resource sets which is consecutively located.

For example, the locations of the plurality of resource sets associated with the same QCL related information (i.e., included in the same resource set group) in the time domain may be determined based on the received information related to the activation of the frequency hopping. Alternatively, whether the frequency hopping is activated may also be determined based on the locations of the resource sets associated with the same QCL related information in the time domain.

For example, the operation of the UE (e.g., reference numeral 100 and/or 200 of FIGS. 17 to 21) which receives the first DMRS, the first data, the second DMRS, and the second data in steps S1520 and S1530 described above may be implemented by the devices of FIGS. 17 to 21 to be described below. For example, referring to FIG. 18, one or more processors 102 may control one or more transceiver 106 and/or one or more memories 104 to receive the first DMRS, the first data, the second DMRS, and the second data, and one or more transceivers 106 may receive the first DMRS, the first data, the second DMRS, and the second data.

FIG. 16 illustrates an example of an operation flowchart of a base station (BS) performing data transmission and reception to which the methods (e.g., method 1/2/3/3-1/3-2/3-3/4/5, etc.) may be applied. FIG. 16 is just for convenience of the description and does not limit the scope of the present disclosure. Further, some step(s) illustrated in FIG. 16 may be omitted according to a situation and/or a configuration.

The base station may be a mean collecting naming an object performing transmission and reception of data with the UE. For example, the base station may be a concept including one or more transmission points (TPs), one or more transmission and reception points (TRPs), and the like. Further, the TP and/or the TRP may include a panel, transmission and reception units, and the like of the base station. Further, as described above, the TRP may be distinguished according to information (e.g., an index or ID) on a CORE-SET group (or CORESET pool). As an example, when one UE is configured to perform transmission/reception with multiple TRPs (or cells), this may mean that multiple CORESET groups (or CORESET pools) are configured for one UE. The configuration for the CORESET group (or CORESET pool) may be performed through the higher layer signaling (e.g., RRC signaling).

The base station (BS) may transmit configuration information (S1610). The configuration information may include resource allocation information related to a plurality of resource set groups. Each resource set group may include a plurality of resource sets. For example, the resource set group may corresponding to the time unit group, and each resource set of the plurality of resource sets may correspond to a time unit (e.g., a symbol group, a symbol set, etc.). Each resource set may be constituted by one of one or more symbols, sub-slots, or slots.

The base station may transmit, to the UE, information indicating whether the same precoder is applied to the plurality of resource sets included in the same resource set group. Further, the base station may also transmit, to the UE, bitmap type information related to DMRS omission (i.e., the operation of transmitting/receiving the data instead of the DMRS). In addition, the base station may also transmit, to the UE, information related to activation of the frequency hopping. Further, the base station may also transmit, to the UE, information on the number of times at which the transport block is repeatedly transmitted. For example, each information described above may be included in the configuration information or transmitted through separate signaling.

Further, for example, the base station may allocate the resource so that the plurality of resource sets included in the same resource set group is consecutively positioned in the time domain. Alternatively, the base station may also allocate the resource so that the plurality of resource sets included in each resource set group is positioned in the cyclic shift form in the time domain.

The base station may further transmit, to the UE, a unit (e.g., a slot, a symbol, etc.) in which the transport block is repeatedly transmitted, the number of resources (e.g., symbols) constituting one resource set (e.g., time unit), an interval between resource sets associated with the same QCL related information, and/or period information, and as an example, the existing DCI field may be used.

The operation in step S1610 may correspond to the UE operation in step S1510 described above, and as a result, hereinafter, a duplicated description will be omitted.

For example, an operation of the base station (e.g., reference numeral 100 and/or 200 of FIGS. 17 to 21) which transmits the configuration information in step S1610 described above may be implemented by devices of FIGS. 17 to 21 to be described below. For example, referring to FIG. 18, one or more processors 102 may control one or more transceivers 106 and/or one or more memories 104 so as to transmit the configuration information and one or more transceivers 106 may transmit the configuration information to the UE.

The base station may transmit, to the UE, a first Demodulation Reference Signal (DMRS) and first data in a first resource set (S1620), and transmit a second DMRS and second data in a second resource set (S1630).

For example, the first resource set and the second resource set may be included in the same resource set group, and QCL related information associated with the respective resource sets included in the same resource set group may be same. That is, the same QCL related information may be applied to the first DMRS and/or the first data, and the second DMRS and/or the second data.

The base station may encode the first data and the second data from the same transport block. The same precoder may be applied to the plurality of resource sets included in the same resource set group.

Further, for example, as the above-described proposal methods (e.g., method 3/3-1/3-2/3-3, etc), the base station may transmit the first DMRS in such a manner that so that a location of a frequency resource from which the second DMRS is transmitted may not be overlapped by being shifted from a location of a frequency resource from which the first DMRS is transmitted, and not be overlapped.

As another example, the base station may transmit the second data at the resource location of the second DMRS instead of transmitting the second DMRS in the second resource set. Alternatively, the base station may transmit the first data instead of transmitting the first DMRS in some of the frequency resources of the first DMRS, and transmit the second data instead of transmitting the second DMRS in some of the frequency resources of the second DMRS. For example, the base station may not perform the operation of transmitting the data instead of the DMRS in a first resource set and a last resource set among the plurality of resource sets included in the same resource set group. The base station transmits, to the UE, bitmap type information related to DMRS omission to inform the UE of the resource set in which the data is transmitted instead of the DMRS.

The operation in step S1620/S1630 may correspond to the UE operation in step S1520/1530 described above, and as a result, hereinafter, a duplicated description will be omitted.

For example, the operation of the base station (e.g., reference numeral 100 and/or 200 of FIGS. 17 to 21) which transmits the first DMRS, the first data, the second DMRS, and the second data in steps S1620 and S1630 described above may be implemented by the devices in FIGS. 17 to 21 to be described below. For example, referring to FIG. 18, one or more processors 102 may control one or more transceiver 106 and/or one or more memories 104 to transmit the first DMRS, the first data, the second DMRS, and the second data, and one or more transceivers 106 may transmit the first DMRS, the first data, the second DMRS, and the second data.

The base station may also receive feedback information for the first DMRS, the first data, the second DMRS, and the second data from the UE. The feedback information may be HARQ-ACK information (e.g., ACK/NACK) for the first data and the second data. The feedback information may be transmitted through an uplink channel (e.g., PUCCH).

As mentioned above, the network side/UE signaling and base station/UE operation (e.g., Method 1/2/3/3-1/3-2/3-3/ 4/5, FIGS. 14/15/16, etc.) may be implemented by devices (e.g., FIGS. 17 to 21) to be described below. For example, the network side (e.g., TRP 1/TRP 2) may correspond to a first wireless device and the UE may correspond to a second wireless device and in some cases, an opposite case thereto may also be considered. For example, the first device (e.g., TRP 1)/the second device (e.g., TRP 2) may correspond to the first wireless device and the UE may correspond to the second wireless device and in some cases, an opposite case thereto may also be considered.

For example, the network side/UE signaling and base station/UE operation (e.g., Method 1/2/3/3-1/3-2/3-3/4/5, FIGS. 14/15/16, etc.) may be processed by one or more processors (e.g., 102 and 202) in FIGS. 17 to 21 and the network side/UE signaling and and base station/UE operation (e.g., Method 1/2/3/3-1/3-2/3-3/4/5, FIGS. 14/15/16, etc.) may be stored in a memory (e.g., one or more memories (e.g., 104 and 204) in the form of a command/program (e.g., instruction and executable code) for driving at least one processor (e.g., 102 and 202) in FIGS. 17 to 21.

Communication System Applied to the Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 17 illustrates a communication system applied to the disclosure.

Referring to FIG. 17, a communication system (1) applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Devices Applicable to the Disclosure

FIG. 18 illustrates wireless devices applicable to the disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to Which Disclosure is Applied

FIG. 19 illustrates a signal processing circuit for a transmit signal.

Referring to FIG. 19, a signal processing circuit 1000 may include a scrambler 1010, a modulator 1020, a layer mapper 1030, a precoder 1040, a resource mapper 1050, and a signal generator 1060. Although not limited thereto, an operation/function of FIG. 19 may be performed by the processors 102 and 202 and/or the transceivers 106 and 206 of FIG. 18. Hardware elements of FIG. 19 may be implemented in the processors 102 and 202 and/or the transceivers 106 and 206 of FIG. 18. For example, blocks 1010 to 1060 may be implemented in the processors 102 and 202 of FIG. 18. Further, blocks 1010 to 1050 may be implemented in the processors 102 and 202 of FIG. 18 and the block 1060 of FIG. 18 and the block 1060 may be implemented in the transceivers 106 and 206 of FIG. 18.

A codeword may be transformed into a radio signal via the signal processing circuit 1000 of FIG. 19. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-BPSK (pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (1010 to 1060) of FIG. 19. For example, the wireless device (e.g., 100 or 200 of FIG. 18) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Disclosure

FIG. 20 illustrates another example of a wireless device applied to the disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 18. For example, the transceiver(s) 114 may include the one or more transceivers 106 and 106 and/or the one or more antennas 108 and 108 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to Which Disclosure is Applied

FIG. 21 illustrates a portable device applied to the disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 21, a portable device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 20, respectively.

The communication unit 110 may transmit/receive a signal (e.g., data, a control signal, etc.) to/from another wireless device and eNBs. The control unit 120 may perform various operations by controlling components of the portable device 100. The control unit 120 may include an Application Processor (AP). The memory unit 130 may store data/parameters/programs/codes/instructions required for driving the portable device 100. Further, the memory unit 130 may store input/output data/information, etc. The power supply unit 140a may supply power to the portable device 100 and include a wired/wireless charging circuit, a battery, and the like. The interface unit 140*b* may support a connection between the portable device 100 and another external device. The interface unit 140*b* may include various ports (e.g., an audio input/output port, a video input/output port) for the connection with the external device. The input/output unit 140*c* may receive or output a video information/signal, an audio information/signal, data, and/or information input from a user. The input/output unit 140*c* may include a camera, a microphone, a user input unit, a display unit 140*d*, a speaker, and/or a haptic module.

As one example, in the case of data communication, the input/output unit 140*c* may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140*c*.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL AVAILABILITY

Although the method of transmitting and receiving data in the wireless communication system of the present disclosure has been described in connection with examples in which it applies to 3GPP LTE/LTE-A system and 5G systems (new RAT systems), the method is also applicable to other various wireless communication systems.

The invention claimed is:

1. A method for receiving, by a user equipment (UE), data in a wireless communication system, the method comprising:
   receiving configuration information including resource allocation information related to a plurality of resource set groups, wherein each of the resource set groups includes a plurality of resource sets;
   receiving a first demodulation reference signal (DMRS) and first data from a first resource set; and
   receiving a second DMRS and second data from a second resource set,
   wherein the first resource set and the second resource set are included in the same resource set group,
   wherein Quasi-co-Location (QCL) related information associated with each resource set included in the same resource set group is the same, and
   wherein a location of a frequency resource of the second DMRS is not overlapped by being shifted from a location of a frequency resource of the first DMRS,
   wherein the second DMRS is omitted in the second resource set, and the second data is received in a resource location of the second DMRS.

2. The method of claim 1, wherein the first DMRS is omitted and the first data is received in some of frequency resources of the first DMRS, and
   the second DMRS is omitted and the first data is received in some of frequency resources of the second DMRS.

3. The method of claim 2, wherein the DMRS is not omitted in a first resource set and a last resource set among the plurality of resource sets.

4. The method of claim 3, further comprising:
   receiving information related to omission of the DMRS which is in form of a bitmap,
   wherein whether the DMRS is omitted in the plurality of resource sets is configured based on the information in form of the bitmap.

5. The method of claim 1, further comprising:
   receiving information indicating whether a same precoder is applied to the plurality of resource sets included in a same resource set group.

6. The method of claim 5, wherein the plurality of resource sets are consecutively located in a time domain based on that the same precoder is applied to the plurality of resource sets.

7. The method of claim 1, wherein a same precoder is applied to the plurality of resource sets based on that the plurality of resource sets are consecutively located in the time domain.

8. The method of claim 1, further comprising:
   receiving information related to activation of frequency hopping,
   wherein locations of the plurality of resource sets in the time domain are determined based on the information related to the activation of the frequency hopping.

9. The method of claim 1, wherein whether the frequency hopping is activated is determined based on locations of the plurality of resource sets in the time domain.

10. The method of claim 1, wherein the first data and the second data are included in a same transport block.

11. The method of claim 10, wherein each resource set is comprised of one of one or more symbols, sub-slots, or slots.

12. The method of claim 11, further comprising:
receiving information on a number of times at which the transport block is repeatedly transmitted,
wherein resource units comprising each resource set are calculated based on the information on the number of times at which the transport block is repeatedly transmitted and the number of plurality of resource set groups.

13. A user equipment (UE) for transmitting and receiving data in a wireless communication system, the UE comprising:
one or more transceivers;
one or more processors; and
one or more memories storing instructions for operations executed by the one or more processors and connected to the one or more processors,
wherein the operations include:
receiving configuration information including resource allocation information related to a plurality of resource set groups, wherein each of the resource set groups includes a plurality of resource sets;
receiving a first demodulation reference signal (DMRS) and first data from a first resource set; and
receiving a second DMRS and second data from a second resource set,
wherein the first resource set and the second resource set are included in the same resource set group,
wherein Quasi-co-Location (QCL) related information associated with each resource set included in the same resource set group is the same, and
wherein a location of a frequency resource of the second DMRS is not overlapped by being shifted from a location of a frequency resource of the first DMRS,
wherein the second DMRS is omitted in the second resource set, and the second data is received in a resource location of the second DMRS.

14. A device comprising:
one or more memories and one or more processors functionally connected to the one or more memories,
wherein the one or more processors control the device to:
receive configuration information including resource allocation information related to a plurality of resource set groups, wherein each of the resource set groups includes a plurality of resource sets;
receive a first demodulation reference signal (DMRS) and first data from a first resource set; and
receive a second DMRS and second data from a second resource set,
wherein the first resource set and the second resource set are included in the same resource set group,
wherein Quasi-co-Location (QCL) related information associated with each resource set included in the same resource set group is the same, and
wherein a location of a frequency resource of the second DMRS is not overlapped by being shifted from a location of a frequency resource of the first DMRS,
wherein the second DMRS is omitted in the second resource set, and the second data is received in a resource location of the second DMRS.

* * * * *